(12) United States Patent
Zhou

(10) Patent No.: US 10,766,103 B2
(45) Date of Patent: Sep. 8, 2020

(54) SOLDER ALLOY, SOLDER AND METHOD FOR PRODUCING SAME

(71) Applicant: SHANGHAI PHICHEM MATERIAL CO., LTD., Shanghai (CN)

(72) Inventor: Yongchang Zhou, Kaohsiung (TW)

(73) Assignee: SHANGHAI PHICHEM MATERIAL CO., LTD., Shanghai (CN)

( * ) Notice: Subject to any disclaimer, the term of this patent is extended or adjusted under 35 U.S.C. 154(b) by 0 days.

(21) Appl. No.: 16/266,563

(22) Filed: Feb. 4, 2019

(65) Prior Publication Data

US 2019/0270168 A1 Sep. 5, 2019

(30) Foreign Application Priority Data

Feb. 7, 2018 (TW) .............................. 107104271 A

(51) Int. Cl.
  *B23K 35/02* (2006.01)
  *B23K 35/26* (2006.01)
  *C22C 13/00* (2006.01)
(52) U.S. Cl.
  CPC ........ *B23K 35/262* (2013.01); *B23K 35/0244* (2013.01); *C22C 13/00* (2013.01)
(58) Field of Classification Search
  None
  See application file for complete search history.

(56) References Cited

U.S. PATENT DOCUMENTS 6,861,346 B2 * 3/2005 Tong ....................... H01L 24/11
  438/613
8,221,560 B2 7/2012 Kim et al.

FOREIGN PATENT DOCUMENTS

| CN | 101641179 A | 2/2010 |
| JP | S5516731 A | 2/1980 |
| JP | S59126739 A | 7/1984 |
| JP | H08276291 A | 10/1996 |
| JP | 2000208934 A | 7/2000 |
| JP | 2001205476 A | 7/2001 |
| WO | WO2001031074 * | 5/2001 |
| WO | WO2001031074 A1 | 5/2001 |

OTHER PUBLICATIONS

First Office Action for Chinese Application No. 201810372911.5 dated Mar. 2, 2020 in Chinese with an English translation.

* cited by examiner

*Primary Examiner* — Daniel J. Schleis
(74) *Attorney, Agent, or Firm* — Collard & Roe, P.C.

(57) ABSTRACT

The present invention discloses a solder alloy, solder and a method for producing the same, and belongs to the field of solder. The solder alloy contains 0.9-4.1 wt % of silver, 0.3-1 wt % of copper, 0.02-0.085 wt % of rhodium, and the balance being tin, based on the total weight of the solder alloy being 100 wt %. After the solder formed by the solder alloy of the present invention is subjected to multiple reflows and tested by a ball shear test, the residual tin in the solder joint could reach at least 95%, which meets the ball shear standards required by AEC-Q100.

18 Claims, 12 Drawing Sheets

SOLDER ALLOY, SOLDER AND METHOD FOR PRODUCING SAME

The present application claims priority to China's Taiwan Patent Application No. 107104271, filed with Taiwan Province of China on Feb. 7, 2018, and entitled "Solder alloy and Solder Ball", which is incorporated herein by reference in its entirety.

TECHNICAL FIELD

The present disclosure relates to the field of solder, and in particular, to a solder alloy, solder and a method for producing same.

BACKGROUND

In recent years, with the improvement of environmental awareness, lead-free solder has been widely used in different fields. An Sn—Ag—Cu (SAC) alloy is the most commonly used alloy for producing lead-free solder. In addition, there are other two types of alloy compositions at present. One is an Sn—Ag—Cu—Ni (SACN) alloy formed by adding nickel (Ni) into the SAC alloy. When the SACN alloy is formed into solder, the addition of Ni element could suppress copper element consumption of a copper pad and slow down the fast growth of intermetallic compounds (IMC). The other is an Sn—Ag—Cu—Ni—Bi (SACNB) alloy formed by adding nickel (Ni) and bismuth (Bi) into the SAC alloy. When the SACNB alloy is formed into solder, mechanical properties such as excellent and better hardness, yield strength and tensile strength could be achieved, and in a dense and precise packaging process, solder joints of the solder also have better performance in a thermal cycling test (TCT).

In general, after the solder formed by the above SACN and SACNB alloys is subjected to reflows for multiple times and tested by a solder ball shear test according to the automotive specification of AEC-Q100, when the ball shear speed is above 400 μm/s, the interface strength of the solder joints is often reduced due to the multiple reflows of the solder joints, and thus brittle fracture of an intermetallic compound layer is likely to occur, or failure tends to happen in the process of thermal cycling test at level 1 (−50 □ to +150 □, 1000 cycles), which results in that the soldering strength could not reach the standards required by AEC-Q100.

SUMMARY

In the present disclosure, firstly, rhodium metal is considered to be added into an SAC alloy to improve the physical properties of the alloy, so that when such alloy is used to form solder, after being subjected to reflows for multiple times, the solder joints formed by the solder could still meet the standards required by AEC-Q100.

In one aspect, the embodiments of the present disclosure provide a solder alloy which contains 0.9-4.1 wt % of silver, 0.3-1 wt % of copper, 0.02-0.085 wt % of rhodium, and the balance being tin, based on the total weight of the solder alloy being 100 wt %.

Optionally, the content of the rhodium is 0.03-0.075 wt %.
Optionally, the content of the copper is 0.3-0.7 wt %.
Optionally, the content of the copper is 0.4-0.6 wt %.
Optionally, the solder alloy further contains 0.04-0.06 wt % of nickel, based on the total weight of the solder alloy being 100 wt %.

Optionally, the content of the nickel is 0.045-0.055 wt %.
Optionally, the solder alloy further contains 2-4 wt % of bismuth, based on the total weight of the solder alloy being 100 wt %.

Optionally, the content of the bismuth is 2.9-3.1 wt %.
Optionally, the solder alloy contains 0.9-4.1 wt % of silver, 0.3-1 wt % of copper, 0.02-0.085 wt % of rhodium, 0.04-0.06 wt % of nickel, 2-4 wt % of bismuth, and the balance being tin, based on the total weight of the solder alloy being 100 wt %.

Optionally, the solder alloy contains 0.9-4.1 wt % of silver, 0.4-0.6 wt % of copper, 0.03-0.075 wt % of rhodium, 0.045-0.055 wt % of nickel, 2.9-3.1 wt % of bismuth, and the balance being tin, based on the total weight of the solder alloy being 100 wt %.

In another aspect, the embodiments of the present disclosure provide solder which is formed by any one of the above solder alloys.

Optionally, the solder alloy further contains 0.04-0.06 wt % of nickel based on the total weight of the solder alloy being 100 wt %.

Optionally, the solder alloy further contains 2-4 wt % of bismuth based on the total weight of the solder alloy being 100 wt %.

Optionally, the solder alloy contains 0.9-4.1 wt % of silver, 0.3-1 wt % of copper, 0.02-0.085 wt % of rhodium, 0.04-0.06 wt % of nickel, 2-4 wt % of bismuth, and the balance being tin, based on the total weight of the solder alloy being 100 wt %.

Optionally, the solder is a solder ball and the diameter of the solder ball is 0.05-1 mm.

In yet another aspect, the embodiments of the present disclosure provide a method for producing solder. The method for producing solder includes: mixing silver, copper, rhodium, tin, and optional nickel and bismuth according to the mass percentage of each component in any one of the above solder alloys, and melting the mixture to obtain a melt; and molding the melt to obtain the solder.

Optionally, the method for producing solder includes the following steps when the solder alloy further contains 0.04-0.06 wt % of nickel based on the total weight of the solder alloy being 100 wt %: mixing silver, copper, rhodium, tin and nickel, and melting the mixture to obtain a melt; and molding the melt to obtain the solder.

Optionally, the method for producing solder includes the following steps when the solder alloy further contains 2-4 wt % of bismuth based on the total weight of the solder alloy being 100 wt %: mixing silver, copper, rhodium, tin and bismuth, and melting the mixture to obtain a melt; and molding the melt to obtain the solder.

Optionally, the method for producing solder includes the following steps when the solder alloy contains 0.9-4.1 wt % of silver, 0.3-1 wt % of copper, 0.02-0.085 wt % of rhodium, 0.04-0.06 wt % of nickel, 2-4 wt % of bismuth, and the balance being tin, based on the total weight of the solder alloy being 100 wt %: mixing silver, copper, rhodium, tin, nickel and bismuth, and melting the mixture to obtain a melt; and molding the melt to obtain the solder.

BRIEF DESCRIPTION OF THE DRAWINGS

To describe the technical solutions in the examples of the present disclosure more clearly, brief introduction will be made to the accompanying drawings required for illustrating the examples. Apparently, the accompanying drawings as described in the following show merely some embodiments of the present disclosure, and a person of ordinary skill in the art may still obtain other drawings from these accompanying drawings without creative efforts.

DETAILED DESCRIPTION

Figure 1:
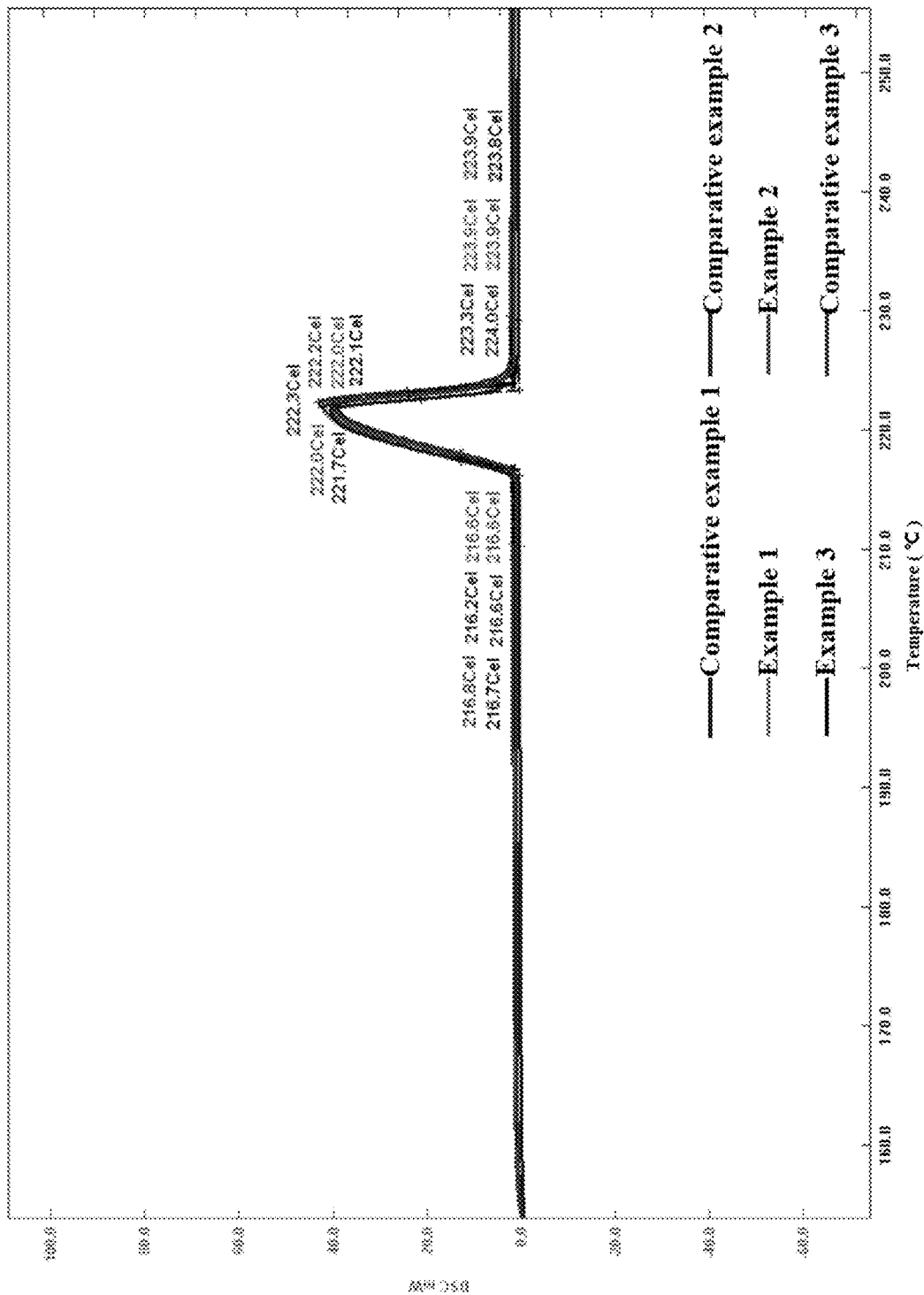
FIG. 1 is a graph showing the profile of the differential thermal analysis of examples 1-3 and comparative examples 1-3.

Unless otherwise specified, all the technical terms used in embodiments of the present disclosure have the same meaning as that commonly understood by a person skilled in the art. In order to make the objectives, technical solutions, and advantages of the present disclosure clearer, the embodiments of the present disclosure are described in further detail below with reference to the accompanying drawings. The present disclosure is further illustrated by the following embodiments, but it should be understood that these embodiments are only intended to illustrate the present disclosure and should not be interpreted as limitations to the implementation of the present disclosure.

On the one hand, the embodiments of the present disclosure disclose a solder alloy which contains 0.9-4.1 wt % of silver, 0.3-1 wt % of copper, 0.02-0.085 wt % of rhodium, and the balance being tin, based on the total weight of the solder alloy being 100 wt %.

Since the solder alloy provided in the embodiments of the present disclosure contains 0.02-0.085 wt % of rhodium, solder joints formed by solder made from such solder alloy provided in the embodiment of the present disclosure would maintain excellent or better performance in a thermal cycling test, also have a higher qualified rate when tested by a ball shear test specified in the automotive specification of AEC-Q100, and could meet the requirement of having 95% of residual tin.

With respect to the above functions and effects, to be more specific, since the solder alloy provided in the embodiment of the present disclosure contains 0.02-0.085 wt % of rhodium, due to the addition of element rhodium, the physical properties of the solder alloy of the present disclosure are changed in comparison with an SAC alloy, an SACN alloy or an SACNB alloy. Furthermore, when this solder alloy is used to form solder, the qualified rate of the solder joints formed by the solder is increased when tested by the ball shear test specified in the automotive specification of AEC-Q10. Moreover, the solder joint could also pass a thermal cycling test specified by the standard of AEC-Q100. However, when the rhodium content is lower than 0.02 wt % or higher than 0.085 wt %, the ability of the solder joint formed from the solder made of the solder alloy to withstand the numbers of thermal cycles could not be improved as expected. At the same time, the cost would also be highly increased due to the high content of rhodium.

It should be noted that, the solder alloy of the present disclosure may further contain impurities, but the impurities are present in a conventional content in the solder alloy. The symbol "wt %" represents mass percentage.

The content of the silver may be 0.9 wt %, 1 wt %, 1.3 wt %, 1.5 wt %, 1.7 wt %, 1.9 wt %, 2 wt %, 2.2 wt %, 2.5 wt %, 2.7 wt %, 2.9 wt %, 3 wt %, 3.2 wt %, 3.5 wt %, 3.7 wt %, 3.9 wt %, 4 wt %, 4.1 wt % or the like. The content of the copper may be 0.3 wt %, 0.4 wt %, 0.5 wt %, 0.6 wt %, 0.7 wt %, 0.8 wt %, 0.9 wt %, 1 wt % or the like. The content of the rhodium may be 0.02 wt %, 0.03 wt %, 0.04 wt %, 0.05 wt %, 0.06 wt %, 0.07 wt %, 0.08 wt %, 0.085 wt % or the like.

In the solder alloy, the content of the copper is 0.3-1 wt %. It should be particularly noted that, when the copper content is lower than 0.3 wt %, the mechanical strength of the solder alloy would be bad, which could not meet the requirements of the industry for reliability of solder. Further, when the copper content is higher than 1 wt %, a solder ball formed by the solder alloy exhibits poor flowability in a molten state after reflow, which would cause the problem that the wetting ability is reduced. Preferably, the content of copper is ranging from 0.3 to 0.7 wt %. More preferably, the content of copper is 0.4-0.6 wt %.

Preferably, the content of the rhodium is 0.03-0.075 wt %.

Preferably, the solder alloy provided in the embodiment of the present disclosure further contains 0.04-0.06 wt % of nickel based on the total weight of the solder alloy being 100 wt %. More preferably, the content of the nickel is 0.045-0.055 wt %.

The content of the nickel may be 0.04 wt %, 0.045 wt %, 0.05 wt %, 0.055 wt %, 0.06 wt % or the like.

Preferably, the solder alloy provided in the embodiment of the present disclosure further contains 2-4 wt % of bismuth based on the total weight of the solder alloy being 100 wt %. It should be particularly noted that, when containing 2-4 wt % of bismuth and 0.02-0.085 wt % of rhodium at the same time, the solder alloy of the present disclosure would have properties such as better yield strength and tensile strength, and the wettability of the solder alloy on a copper substrate is improved. In addition, the solder joints formed by solder made from the solder alloy may suppress the growth of intermetallic compounds more effectively. Moreover, when the content of the bismuth is higher than 2.0 wt %, the solder joints formed by solder made from the solder alloy obtain better performance in the thermal cycling test, and the wettability of the solder alloy for the copper substrate is also improved; and when the content of the bismuth is lower than 4 wt %, properties such as yield strength and tensile strength of the solder alloy would not be too strong, and the solder joints formed by solder made from the solder alloy would be capable of subjecting to higher numbers of cycles during the thermal cycling test. More preferably, the content of the bismuth is 2.9-3.1 wt %. In addition, when the content of the bismuth is 2.9-3.1 wt %, best wettability for the copper substrate would be achieved, and the thickness of the intermetallic compound layer of the solder joints would be reduced more effectively.

Optionally, the solder alloy provided in the embodiment of the present disclosure contains 0.9-4.1 wt % of silver, 0.3-1 wt % of copper, 0.02-0.085 wt % of rhodium, 0.04-0.06 wt % of nickel, 2-4 wt % of bismuth, and the balance being tin, based on the total weight of the solder alloy being 100 wt %.

The various components of the solder alloy cooperate with one another, so that the solder made of the solder alloy maintains good or better performance in the thermal cycling test, performs better to meet the requirements of the ball shear test specified in the automotive specification of AEC-Q100, also has good mechanical strength, yield strength, tensile strength and the like, and exhibits good wettability for copper substrate.

Optionally, the solder alloy provided in the embodiments of the present disclosure contains 0.9-4.1 wt % of silver, 0.4-0.6 wt % of copper, 0.03-0.075 wt % of rhodium, 0.045-0.055 wt % of nickel, 2.9-3.1 wt % of bismuth, and the balance being tin, based on the total weight of the solder alloy being 100 wt %.

As such, the various components of the solder alloy cooperate with one another, so that the solder alloy exhibits better mechanical strength, yield strength, tensile strength and the like, also maintains better performance in the thermal cycling test, and performs better to meet the requirements of the ball shear test specified in the automotive specification of AEC-Q100.

On the other hand, the embodiments of the present disclosure provide solder which is formed by any one of the above solder alloys.

The solder could be applied to soldering and thus the resultant solder joints would have good mechanical strength, yield strength, tensile strength and the like, perform more excellently in a thermal cycling test, and perform better to meet the requirements of a ball shear test specified in the automotive specification of AEC-Q100.

Optionally, in the solder provided in the embodiments of the present disclosure, the solder alloy further contains 0.04-0.06 wt % of nickel based on the total weight of the solder alloy being 100 wt %.

Optionally, in the solder provided in the embodiments of the present disclosure, the solder alloy further contains 2-4 wt % of bismuth based on the total weight of the solder alloy being 100 wt %.

Optionally, in the solder provided in the embodiment of the present disclosure, the solder alloy contains 0.9-4.1 wt % of silver, 0.3-1 wt % of copper, 0.02-0.085 wt % of rhodium, 0.04-0.06 wt % of nickel, 2-4 wt % of bismuth, and the balance being tin, based on the total weight of the solder alloy being 100 wt %.

The solder may adopt various structures. Optionally, the solder is a solder ball and the diameter of the solder ball is 0.05-1 mm.

For example, the diameter of the solder ball may be 0.05 mm, 0.15 mm, 0.25 mm, 0.35 mm, 0.45 mm, 0.55 mm, 0.65 mm, 0.75 mm, 0.85 mm, 0.95 mm, 1 mm or the like.

When the alloy being used as solder, the formed solder ball would have excellent or better mechanical properties such as hardness, yield strength and tensile strength. In addition, in a dense and precise packaging process, a solder joint of the solder ball would also have better performance in the thermal cycling test and perform better to meet the requirements of the ball shear test specified in the automotive specification of AEC-Q100.

On the other hand, the embodiments of the present disclosure provide a method for producing solder. The production method includes the following steps:

step 1, mixing silver, copper, rhodium and tin according to the mass percentage thereof in any one of the above solder alloys and melting the mixture to obtain a melt.

It should be noted that a stirring operation needs to be performed during mixing so as to obtain the melt with uniform composition.

Step 2 is molding the melt to obtain the solder.

Optionally, the production method includes the following steps when the solder alloy further contains 0.04-0.06 wt % of nickel based on the total weight of the solder alloy being 100 wt %: mixing silver, copper, rhodium, tin and nickel and then melting the mixture to obtain a melt; and molding the melt to obtain the solder.

When the solder alloy contains nickel, the step of mixing silver, copper, rhodium, tin and nickel and then melting the mixture to obtain the melt includes, but is not limited to the following steps:

step a, enabling rhodium, tin and nickel to form pre-alloy in a cycle oven;

mixing rhodium, tin and nickel, and then melting and cooling the mixture to obtain the pre-alloy formed by rhodium, tin and nickel; and step b, mixing the pre-alloy with silver and copper and then melting the mixture to obtain the melt.

As such, the various components could be molten sufficiently and uniformly dispersed, which facilitates obtaining the melt with a uniform composition.

Optionally, the production method includes the following steps when the solder alloy further contains 2-4 wt % of bismuth based on the total weight of the solder alloy being 100%: mixing silver, copper, rhodium, tin and bismuth, and melting the mixture to obtain a melt; and molding the melt to obtain the solder.

Optionally, the production method includes the following steps when the solder alloy contains 0.9-4.1 wt % of silver, 0.3-1 wt % of copper, 0.02-0.085 wt % of rhodium, 0.04-0.06 wt % of nickel, 2-4 wt % of bismuth, and the balance being tin, based on the total weight of the solder alloy being 100%: mixing silver, copper, rhodium, tin, nickel and bismuth, and melting the mixture to obtain a melt; and molding the melt to obtain the solder The above production method is simple and could facilitate the popularization of the use of the solder. The produced solder has better mechanical properties, and the resultant solder joints could maintain good or better performance in the thermal cycling test, and have a higher qualified rate in the ball shear test specified in the automotive specification of AEC-Q100.

The present disclosure will be further described below through specific examples.

In the following specific examples, operations involved, of which conditions are not specified, are performed under conventional conditions or conditions suggested by a manufacturer. Used raw materials, of which manufacturers and specifications are not noted, are conventional products which are available by purchase from the market.

It should be noted that, all the chemical components of alloys in the following examples and comparative examples were measured with a direct-reading spectrometer having the model of SPECTROLAB M12, which was purchased from German Spaak Analytical Instrument Company (the agent of which is Shanghai Jinpu Instrument Co., Ltd.). Moreover, the alloys of the examples and the comparative examples were prepared from the required amounts of tin, silver and copper and other required metals (such as rhodium, nickel or bismuth), according to the resultant metal content ratio in the alloy, by a cycle oven and a melting furnace. Considering the melting points and properties of the rhodium and nickel elements, it is necessary to prepare a pre-alloy of tin and said two metal elements first by a cycle oven. In the process of preparing a pre-alloy from rhodium, nickel and tin by a cycle oven, it is necessary to perform stirring to avoid segregation and poor dissolution of rhodium and nickel elements.

Comparative Examples 1, 4 and 7

SAC alloys and solder balls formed by the SAC alloys

The SAC alloys of each of comparative examples 1, 4 and 7 contained tin, silver and copper, and the chemical components and the content (wt %) thereof in the SAC alloys are respectively listed in Table 1, Table 2 and Table 3.

Examples 1-9 and Comparative Examples 2, 3, 5, 6, 8 and 9

Rhodium-containing solder alloys and solder balls formed by the solder alloys

The solder alloys of each of examples 1-9 and comparative examples 2, 3, 5, 6, 8 and 9 contained tin, silver, copper and rhodium, and the chemical components and the content (wt %) thereof in the solder alloys are respectively listed in Tables 1-3.

TABLE 1

| | Content (wt %) | | | | | |
|---|---|---|---|---|---|---|
| Components | Comparative example 1 | Comparative example 2 | Example 1 | Example 2 | Example 3 | Comparative example 3 |
| Sn | 95.5102 | 95.4388 | 95.4554 | 95.4606 | 95.4535 | 95.3976 |
| Ag | 3.9525 | 4.0157 | 3.9849 | 3.9587 | 3.9408 | 3.9780 |
| Cu | 0.5010 | 0.5065 | 0.5016 | 0.5035 | 0.5019 | 0.5055 |
| Rh | 0 | 0.0117 | 0.0312 | 0.0501 | 0.0724 | 0.0918 |
| Ni | 0.0076 | 0.0007 | 0.0007 | 0.0005 | 0.0011 | 0.0006 |
| Bi | 0.0021 | 0.0019 | 0.0016 | 0.0017 | 0.0018 | 0.0016 |

TABLE 2

| | Content (wt %) | | | | | |
|---|---|---|---|---|---|---|
| Components | Comparative example 4 | Comparative example 5 | Example 4 | Example 5 | Example 6 | Comparative example 6 |
| Sn | 96.4956 | 96.4381 | 96.5037 | 96.4206 | 96.4448 | 96.3681 |
| Ag | 2.9853 | 3.0198 | 2.9524 | 2.9951 | 2.9635 | 3.0096 |
| Cu | 0.4909 | 0.5065 | 0.4845 | 0.5067 | 0.4945 | 0.5045 |
| Rh | 0 | 0.0101 | 0.0321 | 0.0515 | 0.0712 | 0.0908 |
| Ni | 0.0002 | 0.0004 | 0.0004 | 0.0008 | 0.0003 | 0.0003 |
| Bi | 0.0022 | 0.002 | 0.0020 | 0.0020 | 0.0020 | 0.0021 |

TABLE 3

| | Content (wt %) | | | | | |
|---|---|---|---|---|---|---|
| Components | Comparative example 7 | Comparative example 8 | Example 7 | Example 8 | Example 9 | Comparative example 9 |
| Sn | 98.4241 | 98.4653 | 98.4865 | 98.4961 | 98.4241 | 98.4653 |
| Ag | 1.0329 | 1.0006 | 0.9826 | 0.9811 | 1.0329 | 1.0006 |
| Cu | 0.5213 | 0.5125 | 0.5117 | 0.5011 | 0.5213 | 0.5125 |
| Rh | 0 | 0.0122 | 0.0329 | 0.0525 | 0.0721 | 0.0927 |
| Ni | 0.0001 | 0.0002 | 0.0002 | 0.0002 | 0.0001 | 0.0002 |
| Bi | 0.0016 | 0.0015 | 0.0016 | 0.0016 | 0.0016 | 0.0015 |

COMPARATIVE EXAMPLES 10, 13, 16 AND 19

Nickel-containing solder alloys and solder balls formed by the solder alloys

The solder alloys of each of comparative examples 10, 13, 16 and 19 contained tin, silver, copper and nickel, and the chemical components and the content (wt %) thereof in the solder alloy are respectively listed in Tables 4-7.

Examples 10-29 and Comparative Examples 11, 12, 14, 15, 17, 18, 20 and 21

Rhodium- and nickel-containing solder alloys and solder balls formed by the solder alloys The solder alloys of each of examples 10-29 and comparative examples 11, 12, 14, 15, 17, 18, 20 and 21 contained tin, silver, copper, rhodium and nickel, and the chemical components and the content (wt %) thereof in the solder alloy are respectively listed in Tables 4-7.

TABLE 4

| Components | Content (wt %) | | | | | | | |
|---|---|---|---|---|---|---|---|---|
| | Comparative example 10 | Comparative example 11 | Example 10 | Example 11 | Example 12 | Example 13 | Example 14 | Comparative example 12 |
| Sn | 95.4021 | 95.4185 | 95.4021 | 95.4102 | 95.3658 | 95.385 | 95.3602 | 95.2635 |
| Ag | 4.0108 | 3.9874 | 3.9861 | 3.9910 | 4.0116 | 3.9775 | 3.9887 | 4.0564 |
| Cu | 0.5067 | 0.4987 | 0.5042 | 0.4833 | 0.5001 | 0.5044 | 0.4993 | 0.5083 |
| Rh | 0 | 0.0131 | 0.0232 | 0.0334 | 0.0421 | 0.0533 | 0.0718 | 0.0932 |
| Ni | 0.0515 | 0.0512 | 0.0516 | 0.0510 | 0.0498 | 0.0503 | 0.0498 | 0.0507 |
| Bi | 0.0021 | 0.0021 | 0.0021 | 0.0021 | 0.0022 | 0.0022 | 0.0022 | 0.0022 |

TABLE 5

| Components | Content (wt %) | | | | | | | |
|---|---|---|---|---|---|---|---|---|
| | Comparative example 13 | Comparative example 14 | Example 15 | Example 16 | Example 17 | Example 18 | Example 19 | Comparative example 15 |
| Sn | 96.3696 | 96.4663 | 96.4462 | 96.3988 | 96.3932 | 96.3715 | 96.3665 | 96.3359 |
| Ag | 3.0411 | 2.9408 | 2.9502 | 2.9802 | 2.994 | 3.0058 | 2.9948 | 3.0036 |
| Cu | 0.4987 | 0.4927 | 0.4931 | 0.5014 | 0.4889 | 0.4893 | 0.4869 | 0.4879 |
| Rh | 0 | 0.0128 | 0.0227 | 0.0331 | 0.0434 | 0.0536 | 0.0732 | 0.0935 |
| Ni | 0.0506 | 0.0493 | 0.0495 | 0.0488 | 0.0504 | 0.0507 | 0.0503 | 0.0501 |
| Bi | 0.0019 | 0.0019 | 0.0019 | 0.0020 | 0.0023 | 0.0023 | 0.0023 | 0.0023 |

TABLE 6

| Components | Content (wt %) | | | | | | | |
|---|---|---|---|---|---|---|---|---|
| | Comparative example 16 | Comparative example 17 | Example 20 | Example 21 | Example 22 | Example 23 | Example 24 | Comparative example 18 |
| Sn | 98.2061 | 98.1429 | 98.1392 | 98.1785 | 98.1664 | 98.1134 | 98.1495 | 98.1004 |
| Ag | 1.2038 | 1.2651 | 1.2620 | 1.2209 | 1.2074 | 1.2556 | 1.2001 | 1.2193 |
| Cu | 0.5041 | 0.5017 | 0.5012 | 0.4922 | 0.5077 | 0.5078 | 0.5011 | 0.5100 |
| Rh | 0 | 0.0121 | 0.0216 | 0.0325 | 0.0415 | 0.0503 | 0.0709 | 0.0914 |
| Ni | 0.0517 | 0.0524 | 0.0523 | 0.0521 | 0.0525 | 0.0503 | 0.0521 | 0.0507 |
| Bi | 0.0022 | 0.0023 | 0.0019 | 0.0019 | 0.002 | 0.002 | 0.0024 | 0.0032 |

TABLE 7

| Components | Content (wt %) | | | | | | | |
|---|---|---|---|---|---|---|---|---|
| | Comparative example 19 | Comparative example 20 | Example 25 | Example 26 | Example 27 | Example 28 | Example 29 | Comparative example 21 |
| Sn | 98.4169 | 98.4185 | 98.3942 | 98.4269 | 98.2784 | 98.2854 | 98.2503 | 98.2599 |
| Ag | 1.0181 | 1.0036 | 1.0116 | 0.9852 | 1.089 | 1.0819 | 1.0899 | 1.0649 |
| Cu | 0.4961 | 0.4971 | 0.5008 | 0.4852 | 0.5134 | 0.5052 | 0.5104 | 0.506 |
| Rh | 0 | 0.0128 | 0.0232 | 0.0335 | 0.0425 | 0.0533 | 0.0731 | 0.0928 |
| Ni | 0.0496 | 0.0493 | 0.0503 | 0.0507 | 0.0515 | 0.0503 | 0.0511 | 0.0513 |
| Bi | 0.0014 | 0.0014 | 0.0014 | 0.0014 | 0.0027 | 0.0027 | 0.0027 | 0.0027 |

Comparative Examples 22, 25 and 28

Nickel- and bismuth-containing solder alloys and solder balls formed by the solder alloys The solder alloys of each of comparative examples 22, 25 and 28 contained tin, silver, copper, nickel and bismuth, and the chemical components and the content (wt %) thereof in the solder alloy are respectively listed in Tables 8-10.

Examples 30-38 and Comparative Examples 23, 24, 26, 27, 29 and 30

Rhodium-, nickel- and bismuth-containing solder alloys and solder balls formed by the solder alloys The solder alloys of each of examples 30-38 and comparative examples 23, 24, 26, 27, 29 and 30 contained tin, silver, copper, rhodium, nickel and bismuth, and the chemical components and the content (wt %) thereof in the solder alloy are respectively listed in Tables 8-10.

TABLE 8

| Components | Content (wt %) | | | | | |
|---|---|---|---|---|---|---|
| | Comparative example 22 | Comparative example 23 | Example 30 | Example 31 | Example 32 | Comparative example 24 |
| Sn | 95.4427 | 95.3617 | 95.3685 | 95.4078 | 95.3128 | 95.2896 |
| Ag | 0.9667 | 1.0217 | 0.9912 | 1.0147 | 1.0073 | 0.9986 |
| Cu | 0.4787 | 0.4950 | 0.4870 | 0.4918 | 0.4897 | 0.4954 |
| Rh | 0 | 0.0095 | 0.0254 | 0.0529 | 0.0831 | 0.0919 |
| Ni | 0.0513 | 0.0503 | 0.0505 | 0.0512 | 0.0487 | 0.0504 |
| Bi | 3.0365 | 3.0338 | 3.0537 | 2.9579 | 3.0346 | 3.0487 |

TABLE 9

| Components | Content (wt %) | | | | | |
|---|---|---|---|---|---|---|
| | Comparative example 25 | Comparative example 26 | Example 33 | Example 34 | Example 35 | Comparative example 27 |
| Sn | 93.4410 | 93.3407 | 93.3357 | 93.3897 | 93.4288 | 93.3535 |
| Ag | 3.0308 | 3.0232 | 3.0878 | 3.0038 | 2.9862 | 3.0453 |
| Cu | 0.4925 | 0.4926 | 0.4972 | 0.4921 | 0.4864 | 0.4941 |
| Rh | 0 | 0.0098 | 0.0246 | 0.0538 | 0.0841 | 0.0937 |
| Ni | 0.0458 | 0.0540 | 0.0461 | 0.0455 | 0.0454 | 0.0463 |
| Bi | 2.9621 | 2.9901 | 2.9816 | 2.9868 | 2.9409 | 2.9392 |

TABLE 10

| Components | Content (wt %) | | | | | |
|---|---|---|---|---|---|---|
| | Comparative example 28 | Comparative example 29 | Example 36 | Example 37 | Example 38 | Comparative example 30 |
| Sn | 92.3901 | 92.3712 | 92.3524 | 92.3116 | 91.5901 | 91.5274 |
| Ag | 3.9567 | 3.9337 | 3.9442 | 3.9571 | 3.9367 | 3.9411 |
| Cu | 0.5109 | 0.5144 | 0.5178 | 0.5167 | 0.4980 | 0.5042 |
| Rh | 0 | 0.0115 | 0.0238 | 0.0531 | 0.0835 | 0.0933 |
| Ni | 0.0520 | 0.0512 | 0.0505 | 0.0512 | 0.0509 | 0.0504 |
| Bi | 3.0583 | 3.0883 | 3.0825 | 3.0805 | 3.0061 | 3.0595 |

Application Example 1

<Analysis of Melting Point of Alloys>

A. Analysis Method

Figure 2:
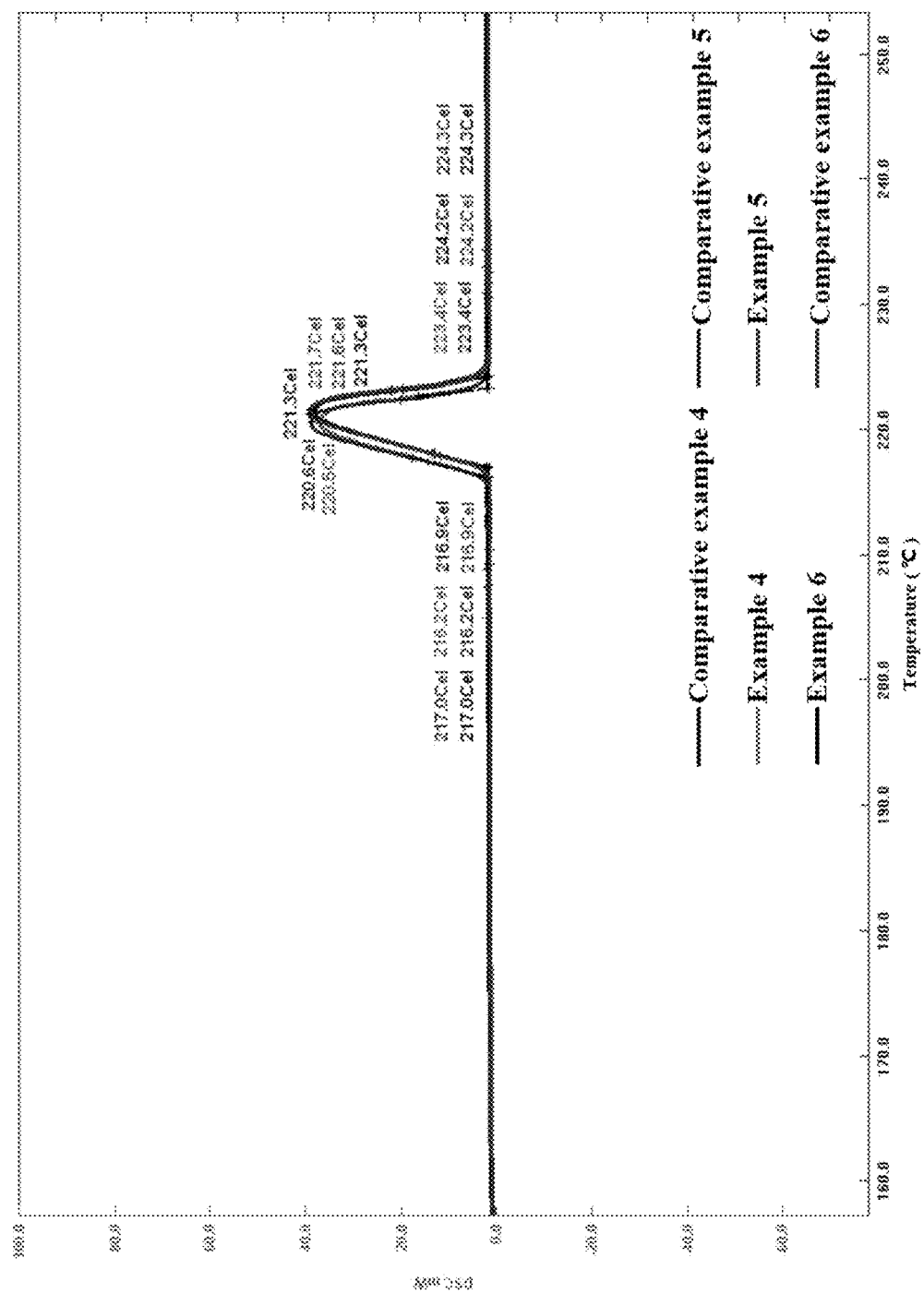
FIG. 2 is a graph showing the profile of the differential thermal analysis of examples 4-6 and comparative examples 4-6.
Figure 3:
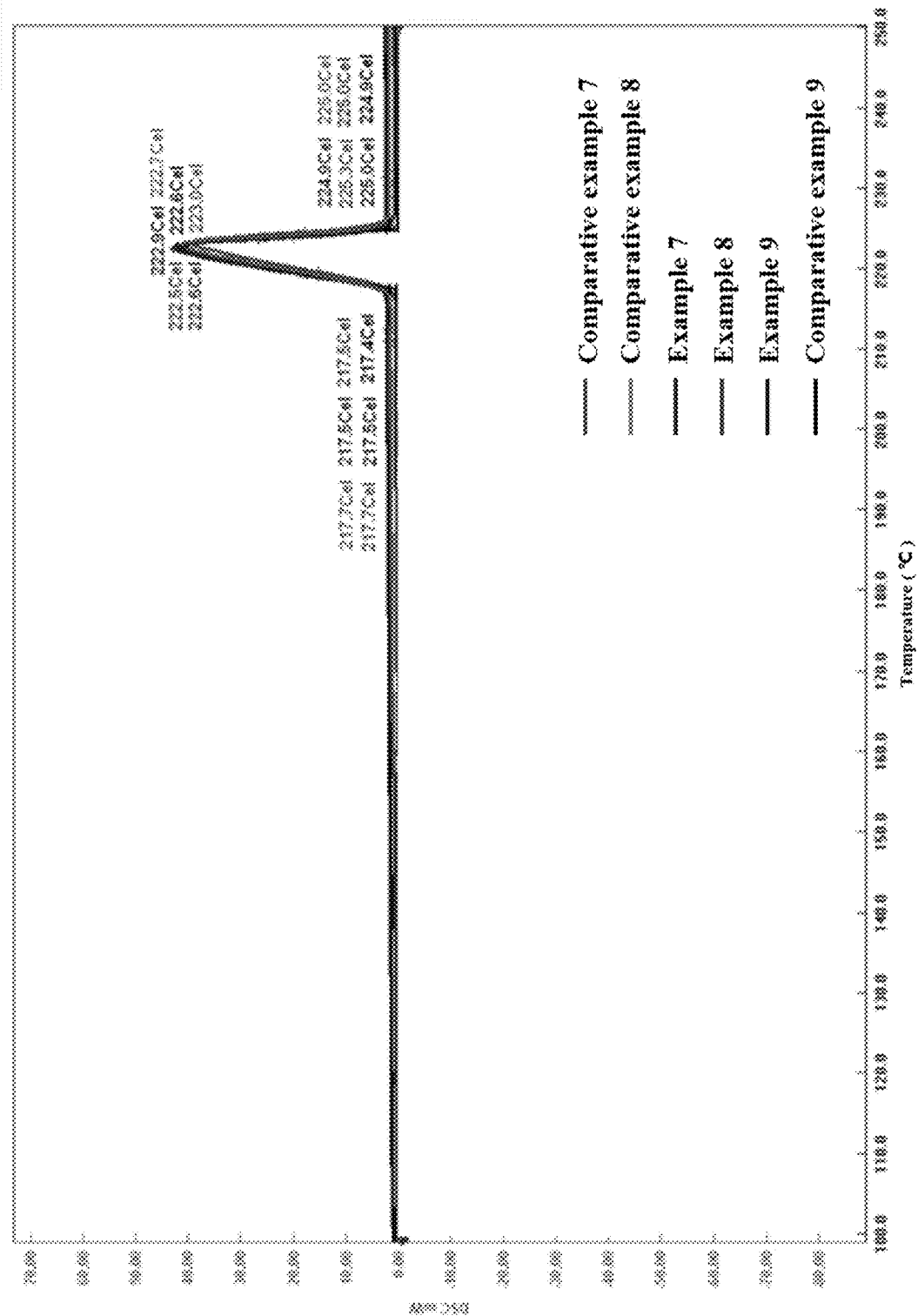
FIG. 3 is a graph showing the profile of the differential thermal analysis of examples 7-9 and comparative examples 7-9.
Figure 4:
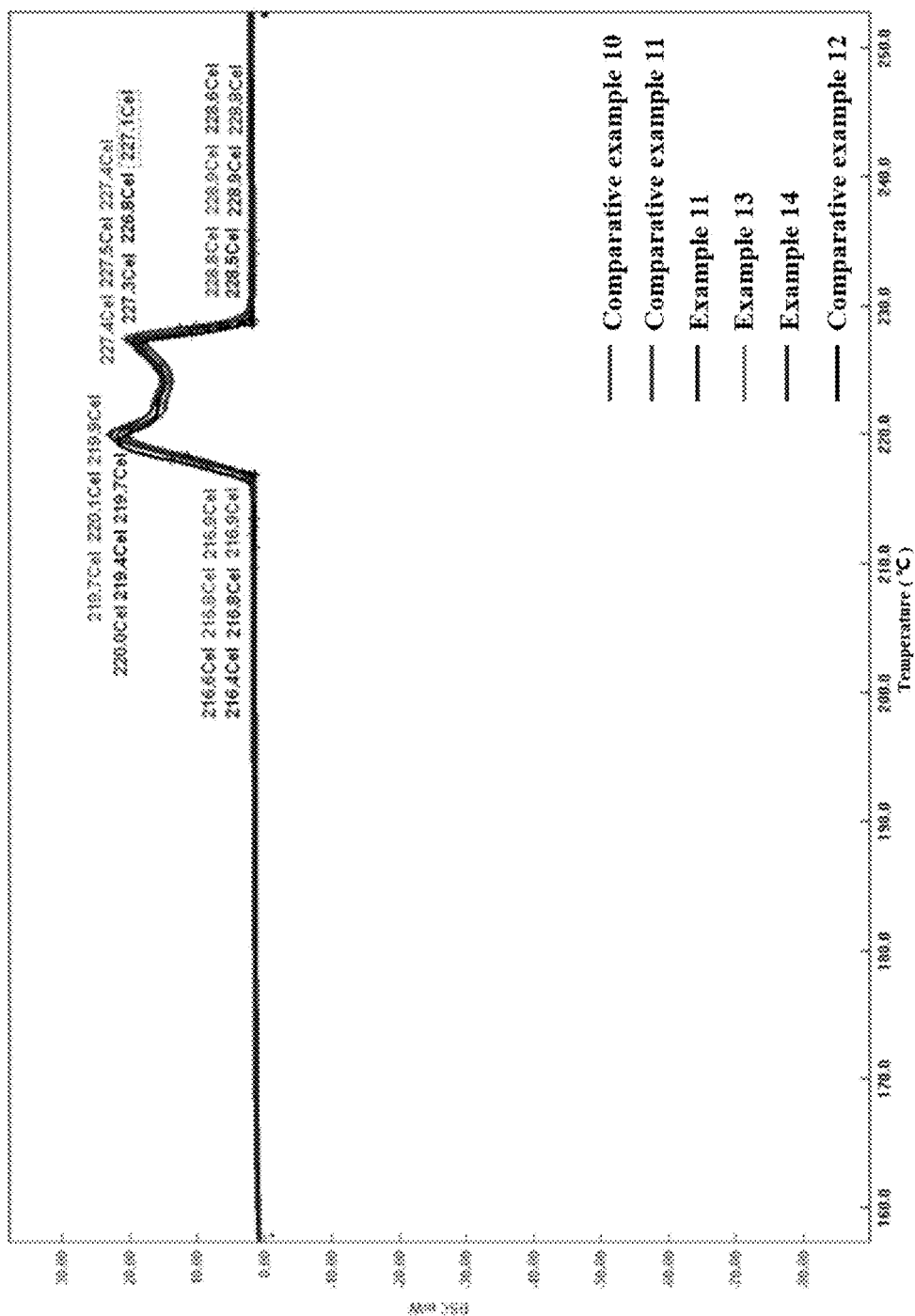
FIG. 4 is a graph showing the profile of the differential thermal analysis of examples 11, 13 and 14 and comparative examples 10-12.
Figure 5:
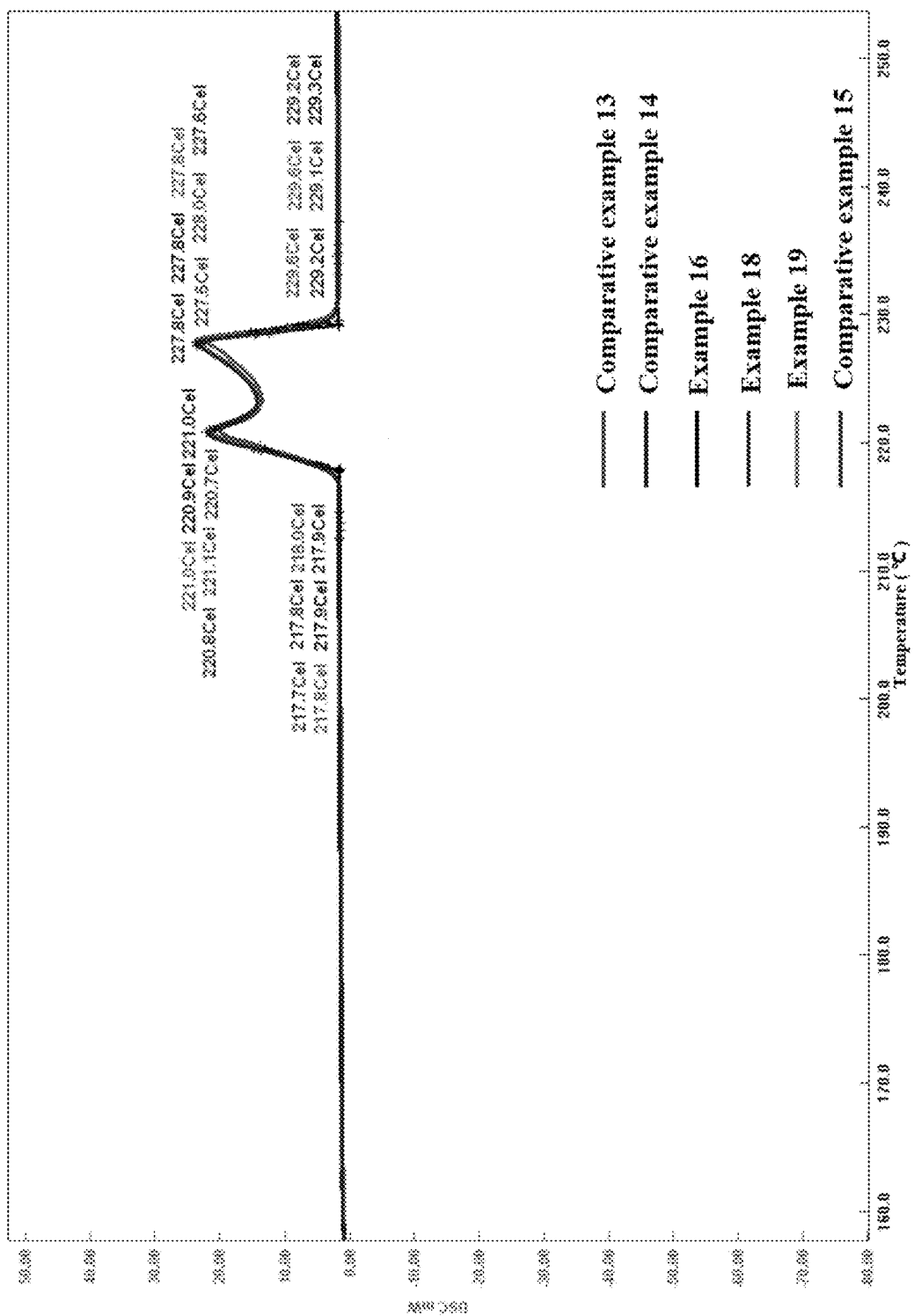
FIG. 5 is a graph showing the profile of the differential thermal analysis of examples 16, 18 and 19 and comparative examples 13-15.
Figure 6:
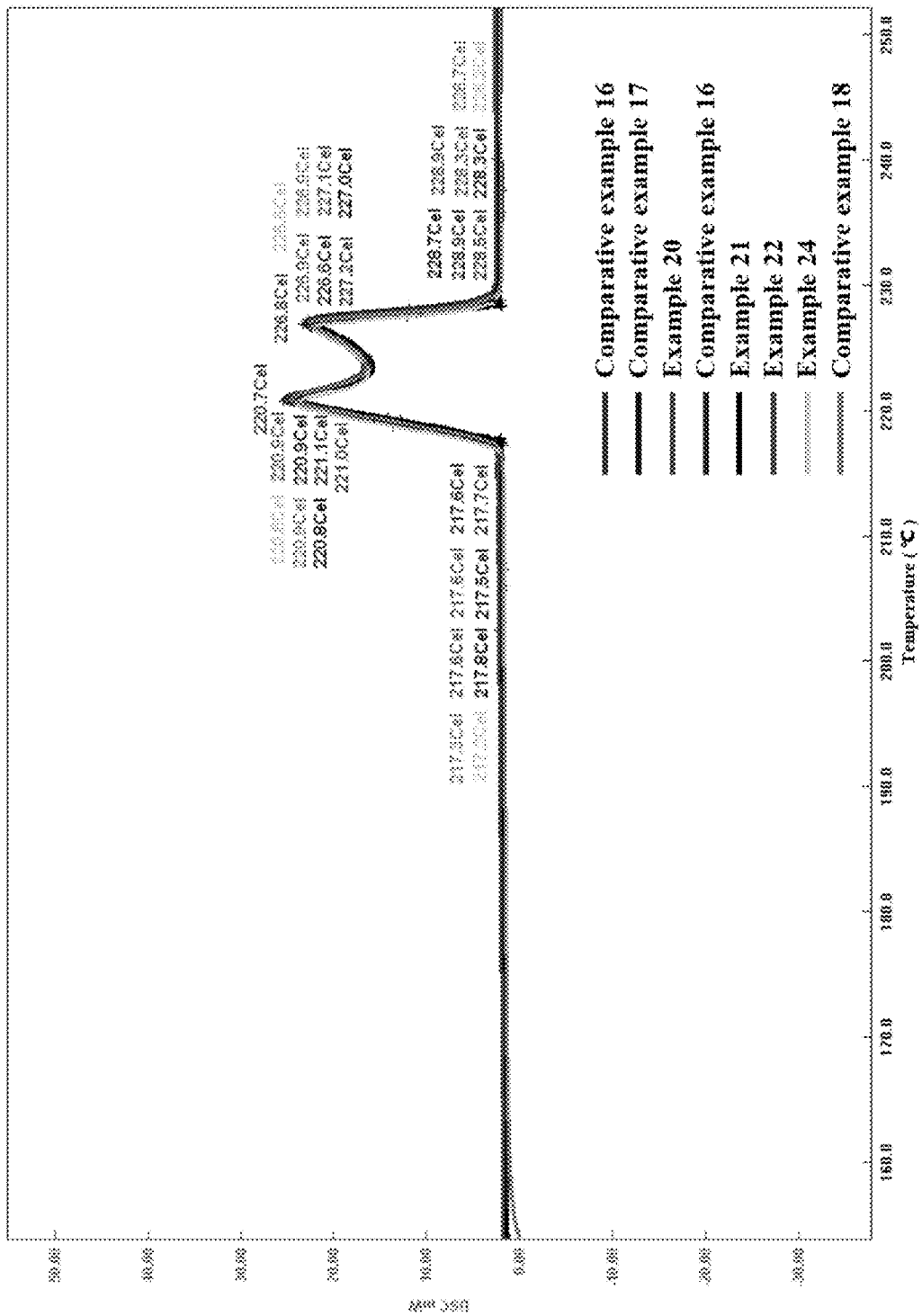
FIG. 6 is a graph showing the profile of the differential thermal analysis of examples 20-24 and comparative examples 16-18.
Figure 7:
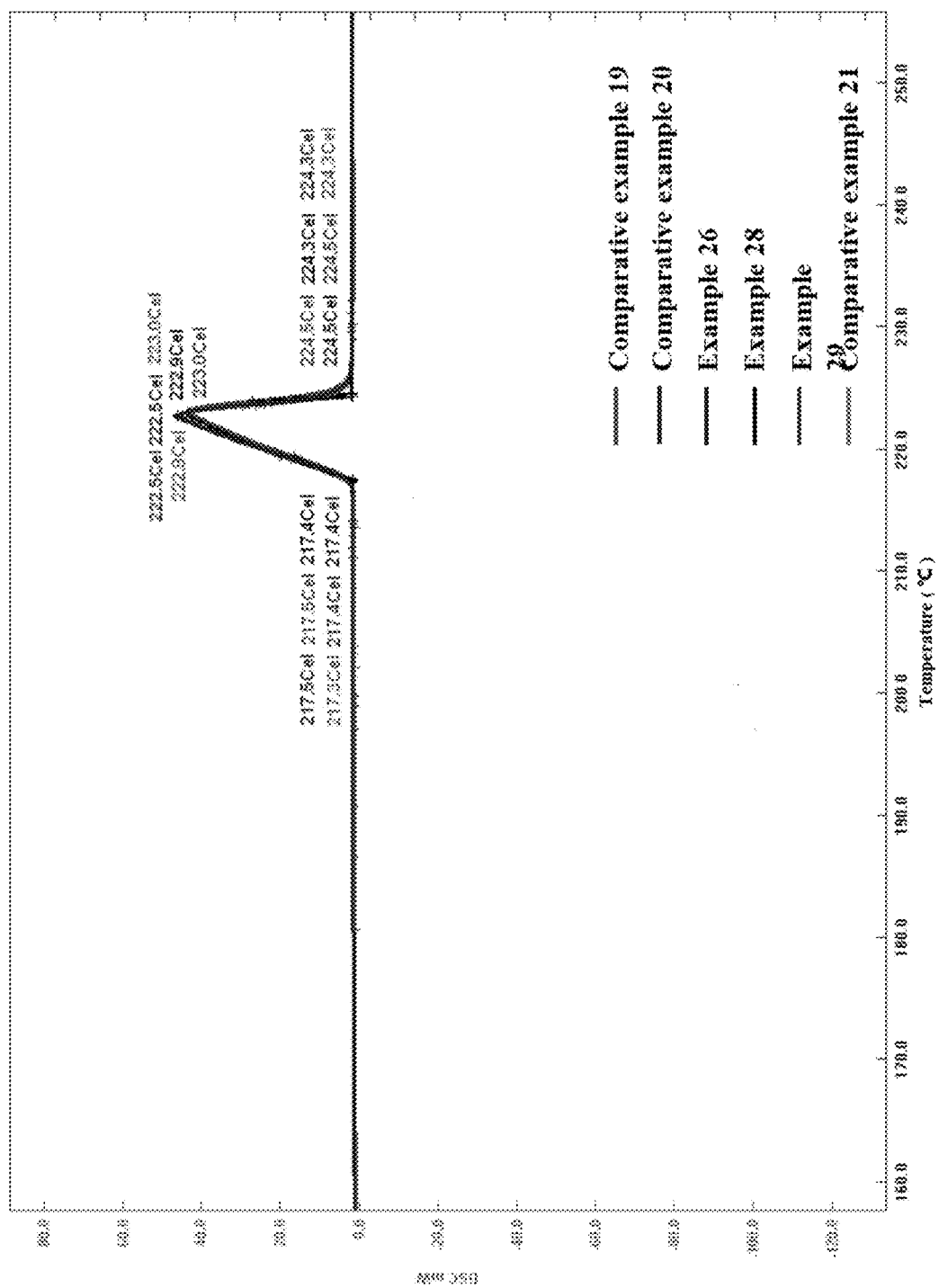
FIG. 7 is a graph showing the profile of the differential thermal analysis of examples 26, 28 and 29 and comparative examples 19-21.

The alloys of examples 1-29 and comparative examples 1-21 were analyzed with differential scanning calorimetry (DSC, model: Perkin Elmer DSC 2260), and the obtained results are shown in FIG. 1 (examples 1-3 and comparative examples 1-3), FIG. 2 (examples 4-6 and comparative examples 4-6), FIG. 3 (examples 7-9 and comparative examples 7-9), FIG. 4 (examples 11, 13 and 14 and comparative examples 10-12), FIG. 5 (examples 16, 18 and 19 and comparative examples 13-15), FIG. 6 (examples 20-24 and comparative examples 16-18), and FIG. 7 (examples 26, 28 and 29 and comparative examples 19-21).

B. Results and Discussion

It can be seen from FIGS. 1-7 that, differential thermal curves basically overlapped, and the melting points of the alloys without addition of rhodium and with the addition of an appropriate amount of rhodium were nearly the same, which indicates that in the present disclosure, the addition of rhodium into the solder alloy would not affect the melting point of the resultant alloys.

Application Example 2

<Analysis of Vickers Hardness of Solder Ball>

A. Analysis Method

The following experiment was performed with a Vickers hardness tester having the model of FM-100e, which was purchased from Taiwan Nakazawa Co., Ltd. After the alloy without addition of rhodium and the alloy with the addition of an appropriate amount of rhodium as shown in the examples and comparative examples were formed into solder balls having a specific diameter (0.45 mm or 0.25 mm), the solder balls were soldered on a substrate to form junctions and epoxy resin was injected between the junctions and mould for embedding, so that the junction portions were fixed by the epoxy resin. Then, the mould was removed and the junction portions were ground with a grinder until about two-quarters of the balls remained; and the balls were polished and the Vickers hardness of the solder balls as ground was measured with a Vickers hardness tester (load: 10 g; time: 10 seconds). Vickers hardness results of alloys of the examples 1-29 and the comparative examples 1-21 obtained through the above method analysis, silver, copper, nickel and rhodium content in the alloys of the various examples and the comparative examples and diameters of the prepared solder balls are listed in Table 11 respectively.

TABLE 11

| Alloy | Solder ball Diameter (mm) | Silver content (wt %) | Copper content (wt %) | Nickel content (wt %) | Rhodium content (wt %) | Vickers Hardness (Hv) |
|---|---|---|---|---|---|---|
| Comparative example 1 | 0.45. | 3.9525 | 0.501 | 0.0076 | 0 | 15.90 |
| Comparative example 2 | | 4.0157. | 0.5065 | 0.0007 | 0.0117 | 15.93 |
| Example 1 | | 3.9849 | 0.5016 | 0.0007 | 0.0312 | 16.80 |
| Example 2 | | 3.9587 | 0.5035 | 0.0005 | 0.0501 | 17.23 |
| Example 3 | | 3.9408 | 0.5019 | 0.0011 | 0.0724 | 17.48 |
| Comparative example 3 | | 3.9780. | 0.5055 | 0.0006 | 0.0918 | 17.52 |
| Comparative example 4 | 0.45. | 2.9853 | 0.4909 | 0.0002 | 0 | 13.57 |
| Comparative example 5 | | 3.0198. | 0.5065 | 0.0004 | 0.0101 | 14.33 |
| Example 4 | | 2.9524 | 0.4845 | 0.0004 | 0.0321 | 15.67 |
| Example 5 | | 2.9951 | 0.5067 | 0.0008 | 0.0515 | 16.70 |
| Example 6 | | 2.9635 | 0.4945 | 0.0003 | 0.0712 | 16.85 |
| Comparative example 6 | | 3.0096. | 0.5045 | 0.0003 | 0.0908 | 16.98 |
| Comparative example 7 | 0.45. | 1.0329 | 0.5213 | 0.0001 | 0 | 11.82 |
| Comparative example 8 | | 1.0006. | 0.5125 | 0.0002 | 0.0122 | 12.14 |
| Example 7 | | 0.9826 | 0.5117 | 0.0002 | 0.0329 | 12.71 |
| Example 8 | | 0.9811 | 0.5011 | 0.0002 | 0.0525 | 13.60 |
| Example 9 | | 1.0329 | 0.5213 | 0.0001 | 0.0721 | 13.89 |
| Comparative example 9 | | 1.0006. | 0.5125 | 0.0002 | 0.0927 | 14.60 |
| Comparative example 10 | 0.25. | 4.0108 | 0.5067 | 0.0515 | 0 | 18.61 |
| Comparative example 11 | | 3.9874. | 0.4987 | 0.0512 | 0.0131 | 18.66 |
| Example 10 | | 3.9861 | 0.5042 | 0.0516 | 0.0232 | 18.67 |
| Example 11 | | 3.9910 | 0.4833 | 0.051 | 0.0334 | 19.01 |
| Example 12 | | 4.0116 | 0.5001 | 0.0498 | 0.0421 | 19.48 |
| Example 13 | | 3.9775 | 0.5044 | 0.0503 | 0.0533 | 19.91 |
| Example 14 | | 3.9887 | 0.4993 | 0.0498 | 0.0718 | 20.77 |
| Comparative example 12 | | 4.0564. | 0.5083 | 0.0507 | 0.0932 | 21.89 |
| Comparative example 13 | 0.25. | 3.0411 | 0.4987 | 0.0506 | 0 | 17.90 |
| Comparative example 14 | | 2.9408. | 0.4927 | 0.0493 | 0.0128 | 18.21 |
| Example 15 | | 2.9502 | 0.4931 | 0.0495 | 0.0227 | 18.61 |
| Example 16 | | 2.9802 | 0.5014 | 0.0488 | 0.0331 | 18.97 |
| Example 17 | | 2.994 | 0.4889 | 0.0504 | 0.0434 | 19.35 |
| Example 18 | | 3.0058 | 0.4893 | 0.0507 | 0.0536 | 19.87 |
| Example 19 | | 2.9948 | 0.4869 | 0.0503 | 0.0732 | 20.64 |
| Comparative example 15 | | 3.0036. | 0.4879 | 0.0501 | 0.0935 | 21.65 |
| Comparative example 16 | 0.25. | 1.2038 | 0.5041 | 0.0517 | 0 | 12.73 |
| Comparative example 17 | | 1.2651. | 0.5017 | 0.0524 | 0.0121 | 13.17 |
| Example 20 | | 1.2620 | 0.5012 | 0.0523 | 0.0216 | 13.87 |
| Example 21 | | 1.2209 | 0.4922 | 0.0521 | 0.0325 | 14.30 |
| Example 22 | | 1.2074 | 0.5077 | 0.0525 | 0.0415 | 14.57 |
| Example 23 | | 1.2556 | 0.5078 | 0.0503 | 0.0503 | 15.43 |
| Example 24 | | 1.2001 | 0.5011 | 0.0521 | 0.0709 | 15.69 |
| Comparative example 18 | | 1.2193. | 0.5100 | 0.0507 | 0.0914 | 15.81 |
| Comparative example 19 | 0.25. | 1.0181 | 0.4961 | 0.0496 | 0 | 13.24 |
| Comparative example 20 | | 1.0036. | 0.4971 | 0.0493 | 0.0128 | 13.33 |
| Example 25 | | 1.0116 | 0.5008 | 0.0503 | 0.0232 | 13.65 |
| Example 26 | | 0.9852 | 0.4852 | 0.0507 | 0.0335 | 13.84 |
| Example 27 | | 1.0890 | 0.5134 | 0.0515 | 0.0425 | 14.35 |
| Example 28 | | 1.0819 | 0.5052 | 0.0503 | 0.0533 | 14.69 |
| Example 29 | | 1.0899 | 0.5104 | 0.0511 | 0.0731 | 15.31 |
| Comparative example 21 | | 1.0649. | 0.5060 | 0.0513 | 0.0928 | 15.67 |

B. Results and Discussion

It can be seen from the hardness results in Table 11 that, when the solder balls have the same diameter and similar silver content, the hardness of the solder balls would increase accordingly with the increase of rhodium content. It can be seen that the hardness of the alloy could be increased by adding rhodium to the solder alloy.

Application Example 3

<Solder Ball Shear Test>

A. Analysis Method

It should be noted first that the solder ball shear test was performed according to the automotive specification of AEC-Q100 and had the following steps.

Step (1)-ball placement: alloys of the examples and comparative examples were respectively prepared into solder balls having a specific diameter (0.45 mm or 0.25 mm) and then the solder balls were attached to a pad through reflow to form solder joints, wherein when the diameter of the solder balls was 0.45 mm, an opening of the pad had a diameter of 0.40 mm; and when the diameter of the solder balls was 0.25 mm, the opening of the pad had a diameter of 0.25 mm.

Figure 8:
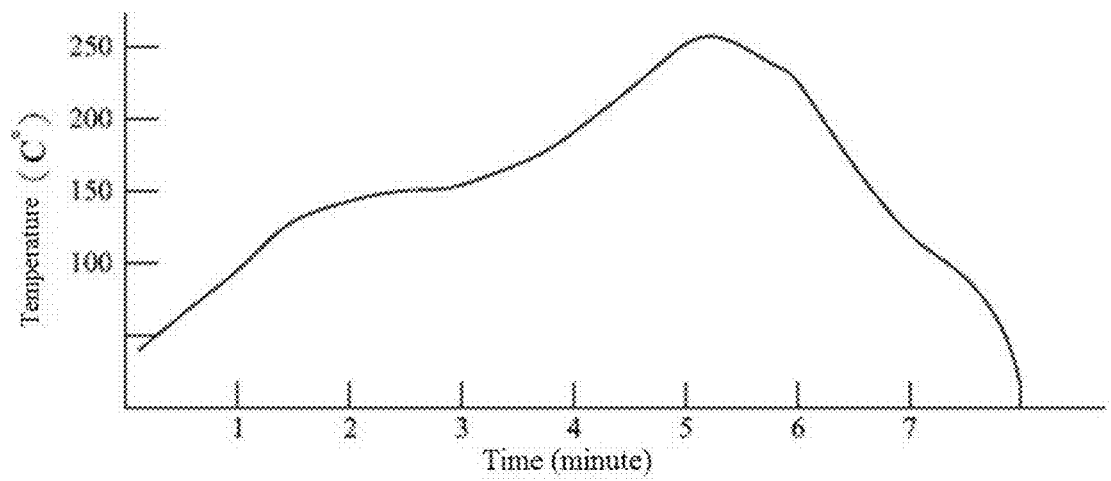
FIG. 8 is a reflow curve graph selected for use in the step of solder ball shear test.
Figure 9:
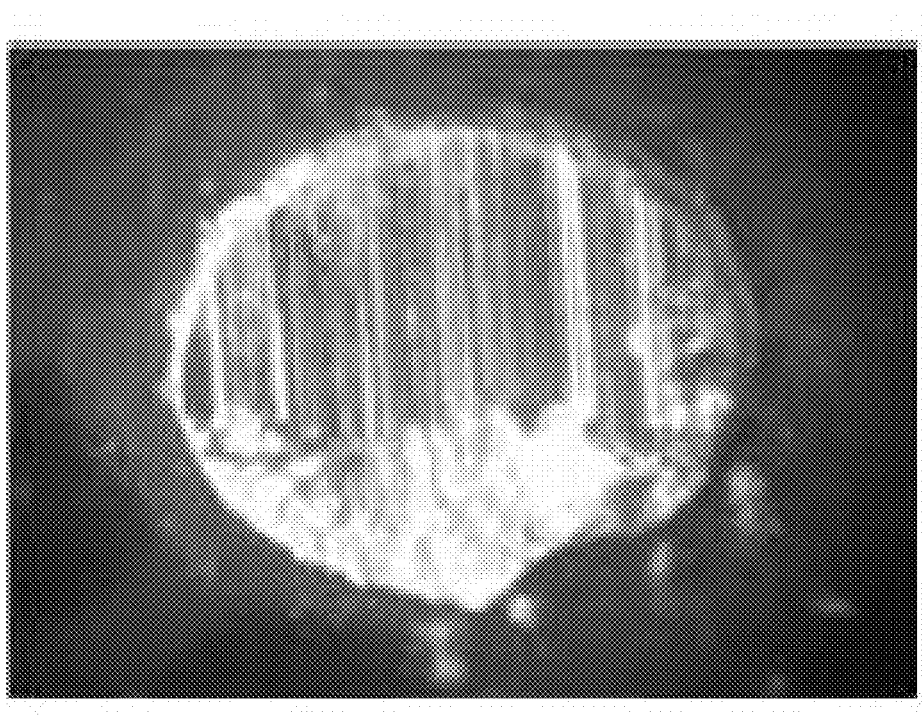
FIG. 9 is a photo of a fracture surface at Mode 1.
Figure 10:
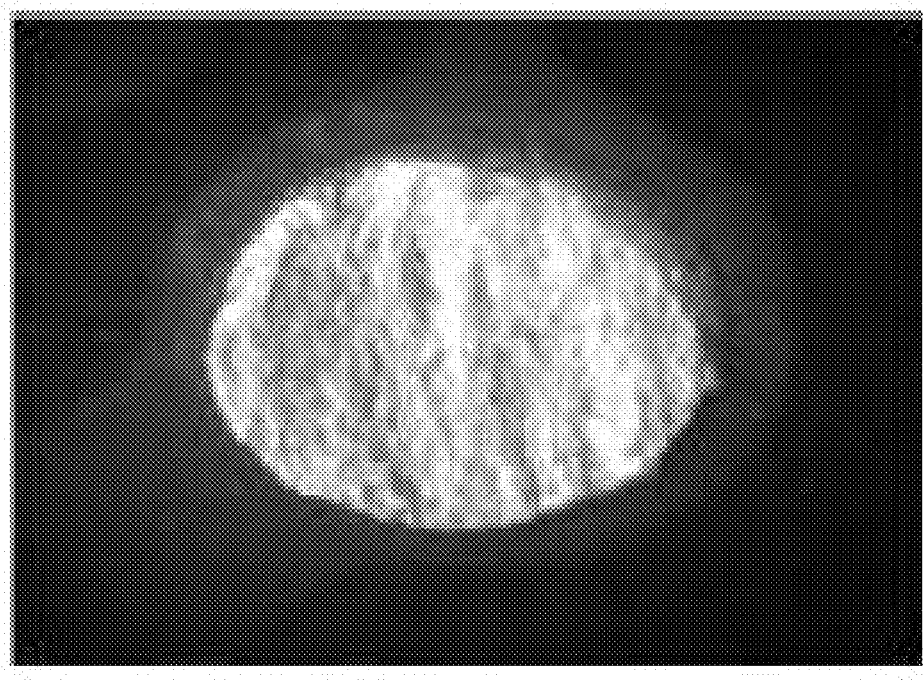
FIG. 10 is a photo of a fracture surface at Mode 2.
Figure 11:
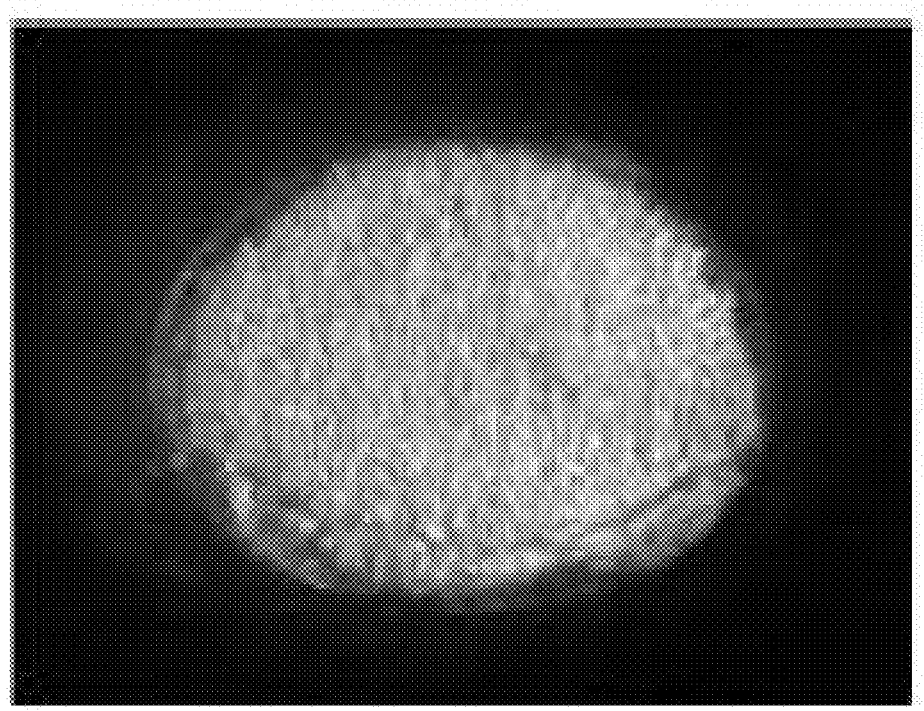
FIG. 11 is a photo of a fracture surface at Mode 3.
Figure 12:
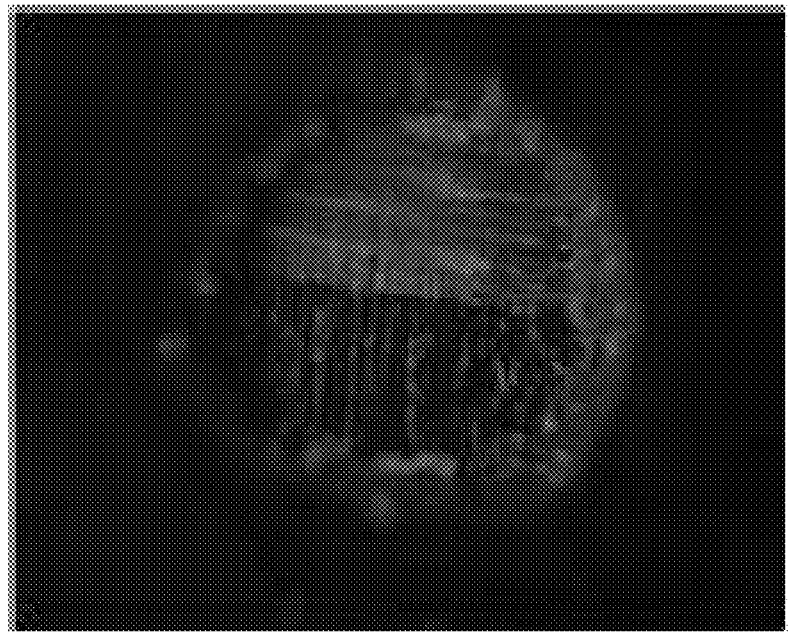
FIG. 12 is a photo of a fracture surface at Mode 4.
Figure 13:
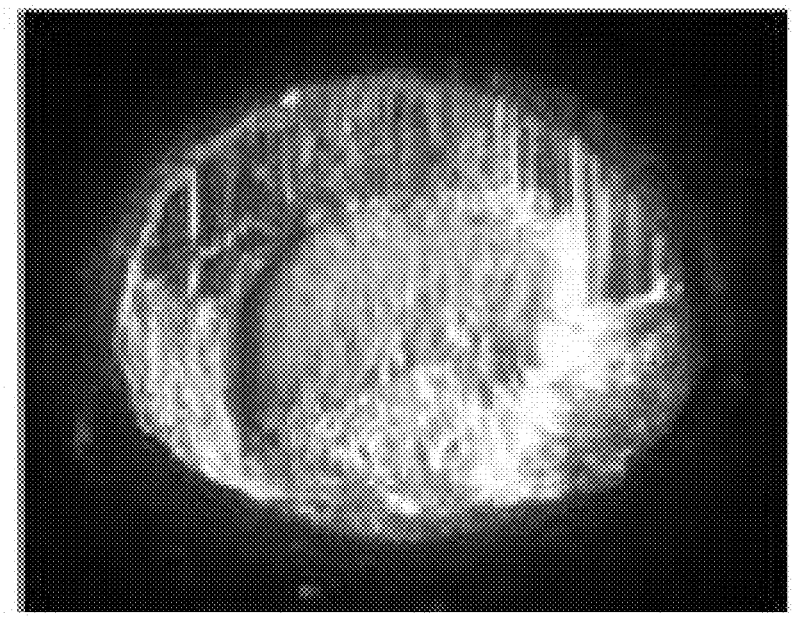
FIG. 13 is a photo of a fracture surface at Mode 5.

Step (2)-reflow: reflow was performed on the solder balls by increasing the temperature from room temperature. Under the condition that internal and external temperatures were uniform, the temperature was risen to peak temperature, which was about 250±5 □, as shown by the profile of FIG. 8. The peak temperature was maintained for about 40-60 seconds (peak time). The reflow was performed on the solder balls and the pad which were subjected to the ball placement in step (1) once by a reflow oven.

Step (3)-reflowing for three times: reflow was performed for three times by the reflow oven on the solder balls and the pad processed in step (2).

Step (4)-solder ball shear test: the ball shear test was performed on the encapsulation obtained after the reflow in steps (2) and (3), by a thrust-tensile machine having the model of Dage-4000 purchased from the Schmidt company. According to 010 REV-A in the specification of AEC-Q100, the contact height (shear height) of a shear knife reached ⅓ of the solder joints and the shear knife shall not touch a soldering-resistance layer of the pad and various conditions of the solder ball shear test are listed in Table 12.

TABLE 12

| Range | 2 kg |
| Shear speed | 400 μm/s |

TABLE 12-continued

| Test load | 25 kg | |
| Ball size | 0.45 mm | 0.25 mm |
| Shear height | 120 μm | 63 μm |
| Over travel | 40 μm | |

Step (5)-observation with a microscope: each of the solder balls would generate a fracture surface due to the fracture caused by the shear test in step (4). The fracture surface was observed with a microscope and the fracture surfaces were divided into five modes (Mode 1-Mode 5) of fracture surface. The description of the fracture surfaces of Mode 1-Mode 5, the proportions of residual tin in the fracture surfaces, and whether an intermetallic compound layer is fractured are listed in Table 13. In addition, photos of the fracture surfaces of Mode 1-Mode 5 are shown in FIGS. 9-13.

TABLE 13

| Mode | Description of fracture surface | Proportion of residual tin (%) | Whether the intermetallic compound layer is fractured | FIG. |
|---|---|---|---|---|
| 1 | ductile fracture occurs from the solder portion and solder remains on all the fracture surfaces | 100% | no | 9 |
| 2 | brittle fracture occurs from the solder portion and solder remains on all the fracture surfaces | 100% | no | 10 |
| 3 | fracture occurs from the solder portion and the intermetallic compound layer | <25% | yes | 11 |
| 4 | fracture occurs from the pad | 0% | no | 12 |
| 5 | the fracture situations of modes 1-3 all occur | <25% | yes | 13 |

The numbers of obtaining each fracture surface mode (the times that the fracture surfaces belonged to Mode 1, Mode 3 or Mode 5) of the alloys of examples 1-29 and comparative examples 1-21 after the above shear test, silver, copper, nickel and rhodium content in alloys of various examples and comparative examples, and the diameters of the prepared solder balls are respectively listed in Table 14 below, wherein the results of the fracture surface modes in Table 14 were obtained through a statistical analysis in which the shear test was performed on 15 (or 20) solder balls that were prepared from the same alloy and had the same diameter.

TABLE 14

| | Solder | | | | | Fracture surface mode | | |
| Alloy | ball diameter (mm) | Silver content (wt %) | Copper content (wt %) | Nickel content (wt %) | Rhodium content (wt %) | numbers of Mode 1 | numbers of Mode 3 | numbers of Mode 5 |
|---|---|---|---|---|---|---|---|---|
| Comparative example 1 | 0.45. | 3.9525 | 0.501 | 0.0076 | 0 | 5 | 0 | 10 |
| Comparative example 2 | | 4.0157. | 0.5065 | 0.0007 | 0.0117 | 9 | 0 | 6 |
| Example 1 | | 3.9849 | 0.5016 | 0.0007 | 0.0312 | 15 | 0 | 0 |
| Example 2 | | 3.9587 | 0.5035 | 0.0005 | 0.0501 | 15 | 0 | 0 |
| Example 3 | | 3.9408 | 0.5019 | 0.0011 | 0.0724 | 15 | 0 | 0 |
| Comparative example 3 | | 3.9780. | 0.5055 | 0.0006 | 0.0918 | 13 | 0 | 2 |

TABLE 14-continued

| Alloy | Solder ball diameter (mm) | Silver content (wt %) | Copper content (wt %) | Nickel content (wt %) | Rhodium content (wt %) | Fracture surface mode numbers of Mode 1 | numbers of Mode 3 | numbers of Mode 5 |
|---|---|---|---|---|---|---|---|---|
| Comparative example 4 | 0.45. | 2.9853 | 0.4909 | 0.0002 | 0 | 4 | 3 | 8 |
| Comparative example 5 | | 3.0198. | 0.5065 | 0.0004 | 0.0101 | 6 | 4 | 5 |
| Example 4 | | 2.9524 | 0.4845 | 0.0004 | 0.0321 | 15 | 0 | 0 |
| Example 5 | | 2.9951 | 0.5067 | 0.0008 | 0.0515 | 15 | 0 | 0 |
| Example 6 | | 2.9635 | 0.4945 | 0.0003 | 0.0712 | 15 | 0 | 0 |
| Comparative example 6 | | 3.0096. | 0.5045 | 0.0003 | 0.0908 | 14 | 0 | 1 |
| Comparative example 7 | 0.45. | 1.0329 | 0.5213 | 0.0001 | 0 | 5 | 2 | 8 |
| Comparative example 8 | | 1.0006. | 0.5125 | 0.0002 | 0.0122 | 6 | 4 | 5 |
| Example 7 | | 0.9826 | 0.5117 | 0.0002 | 0.0329 | 15 | 0 | 0 |
| Example 8 | | 0.9811 | 0.5011 | 0.0002 | 0.0525 | 15 | 0 | 0 |
| Example 9 | | 1.0329 | 0.5213 | 0.0001 | 0.0721 | 15 | 0 | 0 |
| Comparative example 9 | | 1.0006. | 0.5125 | 0.0002 | 0.0927 | 14 | 0 | 1 |
| Comparative example 10 | 0.25. | 4.0108 | 0.5067 | 0.0515 | 0 | 15 | 0 | 5 |
| Comparative example 11 | | 3.9874. | 0.4987 | 0.0512 | 0.0131 | 16 | 0 | 4 |
| Example 10 | | 3.9861 | 0.5042 | 0.0516 | 0.0232 | 20 | 0 | 0 |
| Example 11 | | 3.991 | 0.4833 | 0.051 | 0.0334 | 20 | 0 | 0 |
| Example 12 | | 4.0116 | 0.5001 | 0.0498 | 0.0421 | 20 | 0 | 0 |
| Example 13 | | 3.9775 | 0.5044 | 0.0503 | 0.0533 | 20 | 0 | 0 |
| Example 14 | | 3.9887 | 0.4993 | 0.0498 | 0.0718 | 20 | 0 | 0 |
| Comparative example 12 | | 4.0564. | 0.5083 | 0.0507 | 0.0932 | 19 | 0 | 1 |
| Comparative example 13 | 0.25. | 3.0411 | 0.4987 | 0.0506 | 0 | 17 | 0 | 3 |
| Comparative example 14 | | 2.9408. | 0.4927 | 0.0493 | 0.0128 | 17 | 0 | 3 |
| Example 15 | | 2.9502 | 0.4931 | 0.0495 | 0.0227 | 20 | 0 | 0 |
| Example 16 | | 2.9802 | 0.5014 | 0.0488 | 0.0331 | 20 | 0 | 0 |
| Example 17 | | 2.994 | 0.4889 | 0.0504 | 0.0434 | 20 | 0 | 0 |
| Example 18 | | 3.0058 | 0.4893 | 0.0507 | 0.0536 | 20 | 0 | 0 |
| Example 19 | | 2.9948 | 0.4869 | 0.0503 | 0.0732 | 20 | 0 | 0 |
| Comparative example 15 | | 3.0036. | 0.4879 | 0.0501 | 0.0935 | 19 | 0 | 1 |
| Comparative example 16 | 0.25. | 1.2038 | 0.5041 | 0.0517 | 0 | 17 | 0 | 3 |
| Comparative example 17 | | 1.2651. | 0.5017 | 0.0524 | 0.0121 | 20 | 0 | 0 |
| Example 20 | | 1.2620 | 0.5012 | 0.0523 | 0.0216 | 20 | 0 | 0 |
| Example 21 | | 1.2209 | 0.4922 | 0.0521 | 0.0325 | 20 | 0 | 0 |
| Example 22 | | 1.2074 | 0.5077 | 0.0525 | 0.0415 | 20 | 0 | 0 |
| Example 23 | | 1.2556 | 0.5078 | 0.0503 | 0.0503 | 20 | 0 | 0 |
| Example 24 | | 1.2001 | 0.5011 | 0.0521 | 0.0709 | 20 | 0 | 0 |
| Comparative example 18 | | 1.2193. | 0.5100 | 0.0507 | 0.0914 | 19 | 0 | 1 |
| Comparative example 19 | 0.25. | 1.0181 | 0.4961 | 0.0496 | 0 | 17 | 0 | 3 |
| Comparative example 20 | | 1.0036. | 0.4971 | 0.0493 | 0.0128 | 20 | 0 | 0 |
| Example 25 | | 1.0116 | 0.5008 | 0.0503 | 0.0232 | 20 | 0 | 0 |
| Example 26 | | 0.9852 | 0.4852 | 0.0507 | 0.0335 | 20 | 0 | 0 |
| Example 27 | | 1.0890 | 0.5134 | 0.0515 | 0.0425 | 20 | 0 | 0 |
| Example 28 | | 1.0819 | 0.5052 | 0.0503 | 0.0533 | 20 | 0 | 0 |

TABLE 14-continued

| Alloy | Solder ball diameter (mm) | Silver content (wt %) | Copper content (wt %) | Nickel content (wt %) | Rhodium content (wt %) | Fracture surface mode numbers of Mode 1 | numbers of Mode 3 | numbers of Mode 5 |
|---|---|---|---|---|---|---|---|---|
| Example 29 | | 1.0899 | 0.5104 | 0.0511 | 0.0731 | 20 | 0 | 0 |
| Comparative example 21 | | 1.0649. | 0.5060 | 0.0513 | 0.0928 | 19 | 0 | 1 |

According to the numbers of the fracture surface modes in Table 14 above, the occurrence rate that the intermetallic compound layer was fractured after the shear test (Mode 3 or Mode 5) was calculated. The formula of the occurrence rate is shown as formula I, and the calculation results are listed in Table 15 below.

Occurrence rate (%) = (numbers of Mode 3 + numbers of Mode 5)/(numbers of Mode 1 + numbers of Mode 3 + numbers of Mode 5)*100  (formula I)

TABLE 15

| Alloy | Solder ball diameter (mm) | Silver content (wt %) | Copper content (wt %) | Nickel content (wt %) | Rhodium content (wt %) | The occurrence rate of fracture of the intermetallic compound layer (%) |
|---|---|---|---|---|---|---|
| Comparative example 1 | 0.45. | 3.9525 | 0.501 | 0.0076 | 0 | 67 |
| Comparative example 2 | | 4.0157. | 0.5065 | 0.0007 | 0.0117 | 40 |
| Example 1 | | 3.9849 | 0.5016 | 0.0007 | 0.0312 | 0 |
| Example 2 | | 3.9587 | 0.5035 | 0.0005 | 0.0501 | 0 |
| Example 3 | | 3.9408 | 0.5019 | 0.0011 | 0.0724 | 0 |
| Comparative example 3 | | 3.9780. | 0.5055 | 0.0006 | 0.0918 | 13 |
| Comparative example 4 | 0.45. | 2.9853 | 0.4909 | 0.0002 | 0 | 73 |
| Comparative example 5 | | 3.0198. | 0.5065 | 0.0004 | 0.0101 | 60 |
| Example 4 | | 2.9524 | 0.4845 | 0.0004 | 0.0321 | 0 |
| Example 5 | | 2.9951 | 0.5067 | 0.0008 | 0.0515 | 0 |
| Example 6 | | 2.9635 | 0.4945 | 0.0003 | 0.0712 | 0 |
| Comparative example 6 | | 3.0096. | 0.5045 | 0.0003 | 0.0908 | 7 |
| Comparative example 7 | 0.45. | 1.0329 | 0.5213 | 0.0001 | 0 | 67 |
| Comparative example 8 | | 1.0006. | 0.5125 | 0.0002 | 0.0122 | 60 |
| Example 7 | | 0.9826 | 0.5117 | 0.0002 | 0.0329 | 0 |
| Example 8 | | 0.9811 | 0.5011 | 0.0002 | 0.0525 | 0 |
| Example 9 | | 1.0329 | 0.5213 | 0.0001 | 0.0721 | 0 |
| Comparative example 9 | | 1.0006. | 0.5125 | 0.0002 | 0.0927 | 7 |
| Comparative example 10 | 0.25. | 4.0108 | 0.5067 | 0.0515 | 0 | 25 |
| Comparative example 11 | | 3.9874. | 0.4987 | 0.0512 | 0.0131 | 20 |
| Example 10 | | 3.9861 | 0.5042 | 0.0516 | 0.0232 | 0 |
| Example 11 | | 3.9910 | 0.4833 | 0.051 | 0.0334 | 0 |
| Example 12 | | 4.0116 | 0.5001 | 0.0498 | 0.0421 | 0 |
| Example 13 | | 3.9775 | 0.5044 | 0.0503 | 0.0533 | 0 |
| Example 14 | | 3.9887 | 0.4993 | 0.0498 | 0.0718 | 0 |
| Comparative example 12 | | 4.0564. | 0.5083 | 0.0507 | 0.0932 | 5 |
| Comparative example 13 | 0.25. | 3.0411 | 0.4987 | 0.0506 | 0 | 15 |
| Comparative example 14 | | 2.9408. | 0.4927 | 0.0493 | 0.0128 | 15 |
| Example 15 | | 2.9502 | 0.4931 | 0.0495 | 0.0227 | 0 |
| Example 16 | | 2.9802 | 0.5014 | 0.0488 | 0.0331 | 0 |
| Example 17 | | 2.9940 | 0.4889 | 0.0504 | 0.0434 | 0 |
| Example 18 | | 3.0058 | 0.4893 | 0.0507 | 0.0536 | 0 |

TABLE 15-continued

| Alloy | Solder ball diameter (mm) | Silver content (wt %) | Copper content (wt %) | Nickel content (wt %) | Rhodium content (wt %) | The occurrence rate of fracture of the intermetallic compound layer (%) |
|---|---|---|---|---|---|---|
| Example 19 | | 2.9948 | 0.4869 | 0.0503 | 0.0732 | 0 |
| Comparative example 15 | | 3.0036. | 0.4879 | 0.0501 | 0.0935 | 5 |
| Comparative example 16 | 0.25. | 1.2038 | 0.5041 | 0.0517 | 0 | 15 |
| Comparative example 17 | | 1.2651. | 0.5017 | 0.0524 | 0.0121 | 0 |
| Example 20 | | 1.2620 | 0.5012 | 0.0523 | 0.0216 | 0 |
| Example 21 | | 1.2209 | 0.4922 | 0.0521 | 0.0325 | 0 |
| Example 22 | | 1.2074 | 0.5077 | 0.0525 | 0.0415 | 0 |
| Example 23 | | 1.2556 | 0.5078 | 0.0503 | 0.0503 | 0 |
| Example 24 | | 1.2001 | 0.5011 | 0.0521 | 0.0709 | 0 |
| Comparative example 18 | | 1.2193. | 0.5100 | 0.0507 | 0.0914 | 5 |
| Comparative example 19 | 0.25. | 1.0181 | 0.4961 | 0.0496 | 0 | 15 |
| Comparative example 20 | | 1.0036. | 0.4971 | 0.0493 | 0.0128 | 0 |
| Example 25 | | 1.0116 | 0.5008 | 0.0503 | 0.0232 | 0 |
| Example 26 | | 0.9852 | 0.4852 | 0.0507 | 0.0335 | 0 |
| Example 27 | | 1.0890 | 0.5134 | 0.0515 | 0.0425 | 0 |
| Example 28 | | 1.0819 | 0.5052 | 0.0503 | 0.0533 | 0 |
| Example 29 | | 1.0899 | 0.5104 | 0.0511 | 0.0731 | 0 |
| Comparative example 21 | | 1.0649. | 0.5060 | 0.0513 | 0.0928 | 5 |

B. Results and Discussion

It can be seen from the comparison of examples 1-29 and comparative examples 1-21 that, when the solder alloys contained 0.02-0.085 wt % of rhodium, the probability that the intermetallic compound layer was fractured after the alloy was subjected to multiple reflows and then to the ball shear test (the specification of AEC-Q100) was 0%; but for the solder alloys containing less than 0.02 wt % or greater than 0.085 wt % of rhodium, the occurrence rate that the intermetallic compound layer was fractured was not lower than 5%, and even as high as 73%, except those of the comparative examples 17 and 20 being 0%.

Therefore, it can be seen from the above results that, when the solder alloy containing 0.02-0.085 wt % of rhodium of the present disclosure is used as solder balls, and when the solder balls are placed on the pad, subjected to three reflows and then the solder ball shear test according to the automotive specification of AEC-Q100, and when the shear speed is higher than 400 μm/s, the intermetallic compound layer would not be fractured (mode 1 or mode 5). In contrast, when the solder alloys having a rhodium content not ranging from 0.02 to 0.085 wt % is subjected to the solder ball shear test, a certain proportion of intermetallic compound layers would be fractured, which result in that, the shear force which should be withstood by the solder joints formed from the alloy could not be increased as expected, yet the cost is increased.

Application Example 4

<Thermal Cycling Test (TCT)>

A. Analysis Method

Figure 14:
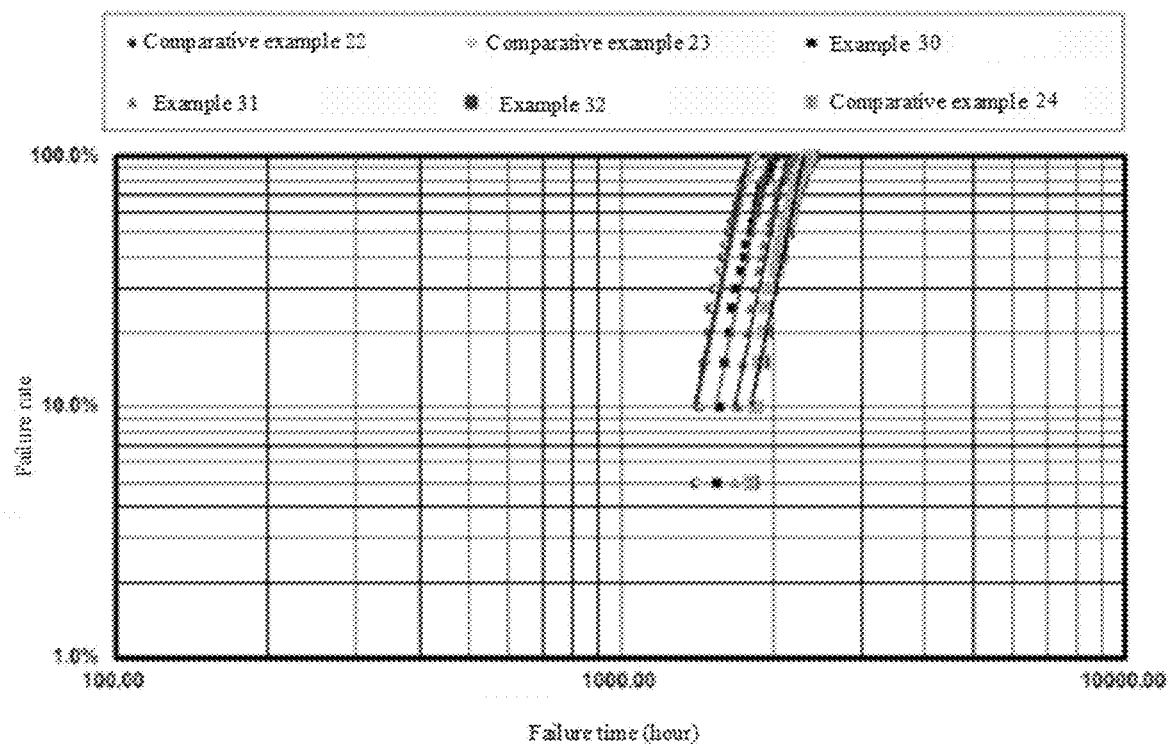
FIG. 14 is a regression line diagram of thermal cycling tests of examples 30-32 and comparative examples 22-24.

The thermal cycling test was performed by placing the solder balls (the diameter was 0.45 mm) prepared from each of examples 30-38 and comparative examples 22-30 on the pad, then soldering them on a PCB board through SMT, and subjecting them to the thermal cycling test at the level 1 (−50 ☐ to +1500 ☐, 1000 cycles). The final results of the thermal cycling test are shown in FIG. 14 (examples 30-32 and comparative examples 22-24), FIG. 15 (examples 33-35 and comparative examples 25-27), and FIG. 16 (examples 36-38 and comparative examples 28-30). Silver, copper, nickel, bismuth and rhodium content of the examples 30-38 and the comparative examples 22-30 are listed in Table 16 below.

TABLE 16

Figure 15:
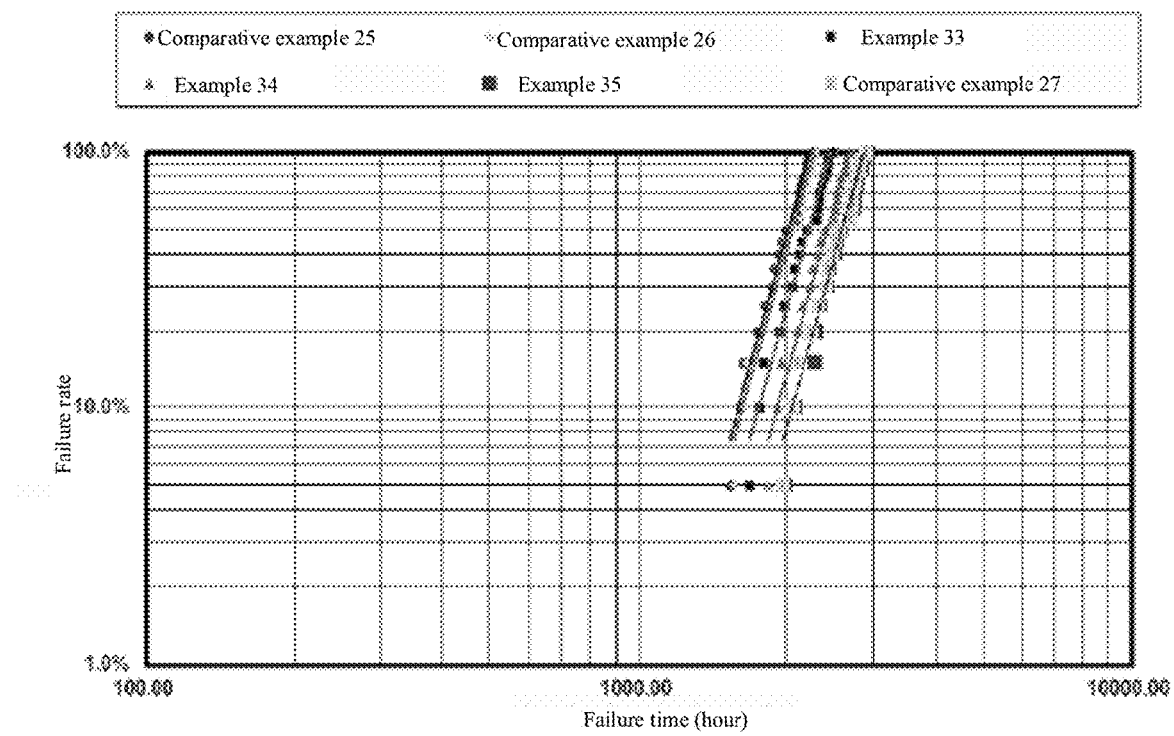
FIG. 15 is a regression line diagram of thermal cycling tests of examples 33-35 and comparative examples 25-27.
Figure 16:
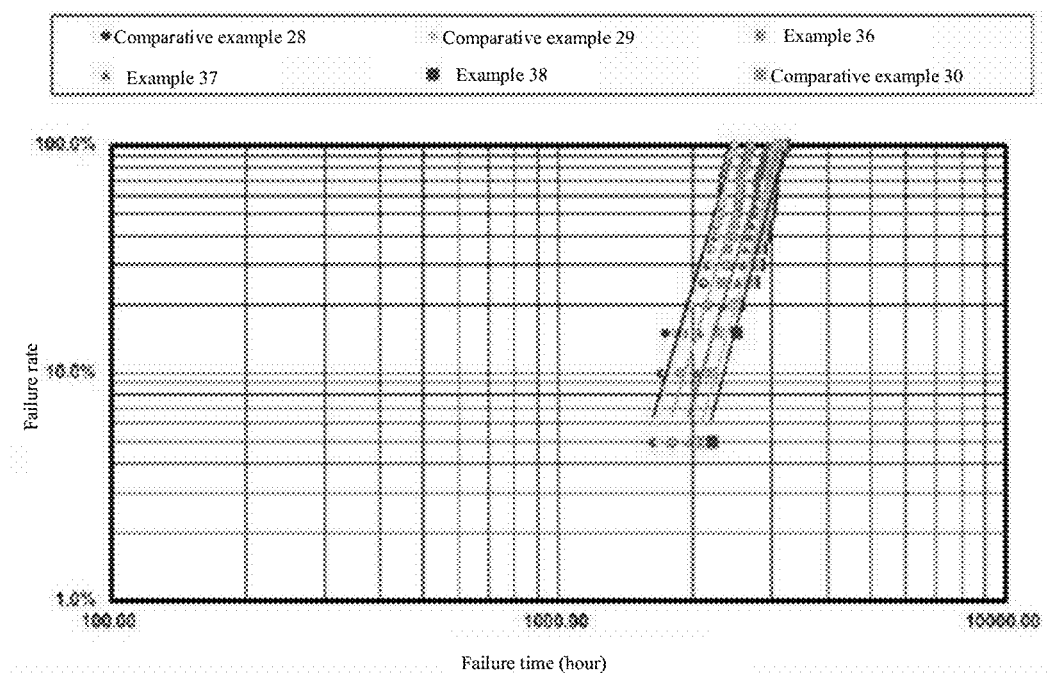
FIG. 16 is a regression line diagram of thermal cycling tests of examples 36-38 and comparative examples 28-30.

| | Alloy | Silver content (wt %) | Copper content (wt %) | Nickel content (wt %) | Bismuth content (wt %) | Rhodium content (wt %) |
|---|---|---|---|---|---|---|
| FIG. 14 | Comparative example 22 | 0.9667. | 0.4787 | 0.0513 | 2.9718 | 0 |
| | Comparative example 23 | 1.0217. | 0.4950 | 0.0503 | 2.9973 | 0.0095 |
| | Example 30 | 0.9912 | 0.4870 | 0.0505 | 2.9998 | 0.0254 |
| | Example 31 | 1.0147 | 0.4918 | 0.0512 | 2.9914 | 0.0529 |
| | Example 32 | 1.0073 | 0.4987 | 0.0487 | 2.9409 | 0.0831 |
| | Comparative example 24 | 0.9986. | 0.4954 | 0.0504 | 2.9558 | 0.0919 |
| FIG. 15 | Comparative example 25 | 3.0308. | 0.4925 | 0.0458 | 2.9815 | 0 |
| | Comparative example 26 | 3.0232. | 0.4926 | 0.0540 | 2.9901 | 0.0098 |
| | Example 33 | 3.0878 | 0.4972 | 0.0461 | 2.9887 | 0.0246 |
| | Example 34 | 3.0038 | 0.4921 | 0.0455 | 2.9668 | 0.0538 |
| | Example 35 | 2.9862 | 0.4864 | 0.0454 | 2.9409 | 0.0841 |
| | Comparative example 27 | 3.0453. | 0.4941 | 0.0463 | 2.9681 | 0.0937 |
| FIG. 16 | Comparative example 28 | 3.9567. | 0.5109 | 0.0520 | 3.0583 | 0 |
| | Comparative example 29 | 3.9337. | 0.5144 | 0.0512 | 3.0883 | 0.0115 |
| | Example 36 | 3.9442 | 0.5178 | 0.0505 | 3.0825 | 0.0238 |
| | Example 37 | 3.9571 | 0.5167 | 0.0512 | 3.0805 | 0.0531 |
| | Example 38 | 3.9367 | 0.4980 | 0.0509 | 3.0061 | 0.0835 |
| | Comparative example 30 | 3.9411. | 0.5042 | 0.0504 | 3.0595 | 0.0933 |

B. Results and Discussion

It should be noted first that the thermal cycling test is used for testing the ability of parts to withstand extreme temperatures (extremely high temperature and extremely low temperature). As shown in FIGS. 14-16, when having the same failure rates, if a part has longer failure time, it would have better capability to withstand extreme temperatures.

According to FIGS. 14-16, it can be found from the comparison among the comparative examples 23, 26 and 29 and examples 30, 33 and 36 that, when the added amount of rhodium is lower than 0.02 wt %, the numbers of the thermal cycling test could not be increased effectively.

It should be additionally noted that, it can be found from the numbers of the thermal cycling test of the comparative examples 24, 27 and 30 and examples 32, 35 and 38 that, when the added amount of rhodium is higher than 0.085 wt %, the numbers of the thermal cycling test that the part can withstand would be reduced, which does not meet the requirements for use.

In addition, the alloys in examples 30-38, each of which contains 0.02-0.085 wt % of rhodium, can withstand the thermal cycling test for more than 2000 times approximately. Moreover, by adding the rhodium element properly, the performance of the solder joint in the thermal cycling test could be improved, but when the added amount of rhodium is higher than 0.085 wt % (such as 0.09 wt %), the numbers of the thermal cycling test that the solder joint can withstand could not be increased anymore, but in contrast the production cost is increased. Therefore, it is verified that the addition of excess amount of the rhodium element could not effectively increase the numbers of the thermal cycling test.

The above description is only preferred embodiments of the present disclosure, and is not intended to limit the scope of protection of the present disclosure. Any modifications, equivalents, improvements and the like made within the spirit and principles of the present disclosure should be included within the scope of protection of the present disclosure.

What is claimed is:

1. A solder alloy, comprising:
    0.9-4.1 wt % of silver, 0.3-0.7 wt % of copper, 0.02-0.085 wt % of rhodium, and the balance of wt % being substantially tin, based on the total weight of the solder alloy being 100 wt %.

2. The solder alloy according to claim 1, wherein the content of the rhodium is 0.03-0.075 wt %.

3. The solder alloy according to claim 1, wherein the content of the copper is 0.4-0.6 wt %.

4. The solder alloy according to claim 1, further containing 0.04-0.06 wt % of nickel, based on the total weight of the solder alloy being 100 wt %.

5. The solder alloy according to claim 4, wherein the content of the nickel is 0.045-0.055 wt %.

6. The solder alloy according to claim 1, further containing 2-4 wt % of bismuth, based on the total weight of the solder alloy being 100 wt %.

7. The solder alloy according to claim 6, wherein the content of the bismuth is 2.9-3.1 wt %.

8. The solder alloy according to claim 1, containing 0.9-4.1 wt % of silver, 0.3-0.7 wt % of copper, 0.02-0.085 wt % of rhodium, 0.04-0.06 wt % of nickel, 2-4 wt % of bismuth, and the balance being tin, based on the total weight of the solder alloy being 100 wt %.

9. The solder alloy according to claim 8, containing 0.9-4.1 wt % of silver, 0.4-0.6 wt % of copper, 0.03-0.075 wt % of rhodium, 0.045-0.055 wt % of nickel, 2.9-3.1 wt % of bismuth, and the balance being tin, based on of the total weight of the solder alloy being 100 wt %.

10. Solder being formed by a solder alloy comprising 0.9-4.1 wt % of silver, 0.3-0.7 wt % of copper, 0.02-0.085 wt % of rhodium, and the balance of wt % being substantially tin, based on the total weight of the solder alloy being 100 wt %.

11. The solder according to claim 10, wherein the solder alloy further contains 0.04-0.06 wt % of nickel based on the total weight of the solder alloy being 100 wt %.

12. The solder according to claim 10, wherein the solder alloy further contains 2-4 wt % of bismuth based on the total weight of the solder alloy being 100 wt %.

13. The solder according to claim 10, wherein the solder alloy contains 0.9-4.1 wt % of silver, 0.3-0.7 wt % of copper, 0.02-0.085 wt % of rhodium, 0.04-0.06 wt % of nickel, 2-4 wt % of bismuth, and the balance being tin, based on the total weight of the solder alloy being 100 wt %.

14. The solder according to claim 10, wherein the solder is a solder ball and the diameter of the solder ball is 0.05-1 mm.

15. A method for producing solder, comprising:
    mixing silver, copper, rhodium and tin according to the mass percentage of each component of the solder alloy of claim 1, and melting the mixture to obtain a melt; and
    molding the melt to obtain the solder.

16. The method according to claim 15, comprising the following steps when the solder alloy further contains 0.04-0.06 wt % of nickel, based on the total weight of the solder alloy being 100 wt %: mixing silver, copper, rhodium, tin and nickel, melting the mixture to obtain a melt; and
    molding the melt to obtain the solder.

17. The method according to claim 15, comprising the following steps when the solder alloy further contains 2-4 wt % of bismuth, based on the total weight of the solder alloy being 100 wt %: mixing silver, copper, rhodium, tin and bismuth, and melting the mixture to obtain a melt; and
    molding the melt to obtain the solder.

18. The method according to claim 15, comprising the following steps when the solder alloy contains 0.9-4.1 wt % of silver, 0.3-0.7 wt % of copper, 0.02-0.085 wt % of rhodium, 0.04-0.06 wt % of nickel, 2-4 wt % of bismuth, and the balance being tin, based on the total weight of the solder alloy being 100 wt %: mixing silver, copper, rhodium, tin, nickel and bismuth, and melting the mixture to obtain a melt; and
    molding the melt to obtain the solder.

* * * * *